(12) United States Patent
Inada

(10) Patent No.: US 6,907,126 B2
(45) Date of Patent: Jun. 14, 2005

(54) ENCRYPTION-DECRYPTION APPARATUS

(75) Inventor: Takeshi Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 856 days.

(21) Appl. No.: 09/836,172

(22) Filed: Apr. 18, 2001

(65) Prior Publication Data

US 2001/0037457 A1 Nov. 1, 2001

(30) Foreign Application Priority Data

Apr. 19, 2000 (JP) ........................................ 2000-118269

(51) Int. Cl.[7] .............................. H04K 1/00; H04L 9/32
(52) U.S. Cl. ..................... 380/255; 380/259; 713/189; 713/191
(58) Field of Search ................................ 380/264–265, 380/268, 46, 255, 259–260; 713/1, 100, 189–194, 174; 709/200, 220–221

(56) References Cited

U.S. PATENT DOCUMENTS 4,185,166 A * 1/1980 Kinch et al. .................. 380/43
6,708,273 B1 * 3/2004 Ober et al. .................. 713/189

FOREIGN PATENT DOCUMENTS

| JP | 5-110558 | 4/1993 |
| JP | 5-233844 | 9/1993 |
| JP | 7-281596 | 10/1995 |
| JP | 10-55135 | 2/1998 |
| JP | 2000-47580 | 2/2000 |

* cited by examiner

Primary Examiner—Hosuk Song
(74) Attorney, Agent, or Firm—Young & Thompson

(57) ABSTRACT

In an encryption-decryption apparatus, a transmitting apparatus encrypts input data to output encrypted data. A network transmits the encrypted data. A receiving apparatus takes as input the encrypted data transmitted through the network, and decrypts the data to send output data. A variable configuration processing circuit encrypts the input data. A ROM outputs circuit data serving as a secret key to the variable configuration processing circuit. Another variable configuration processing circuit decrypts the encrypted data. Another ROM outputs circuit data serving as a secret key to the variable configuration processing circuit. This enables a change in hardware according update of an encryption-decryption algorithm, and more rapid processing of the encryption-decryption operation.

38 Claims, 10 Drawing Sheets

FIG. 2
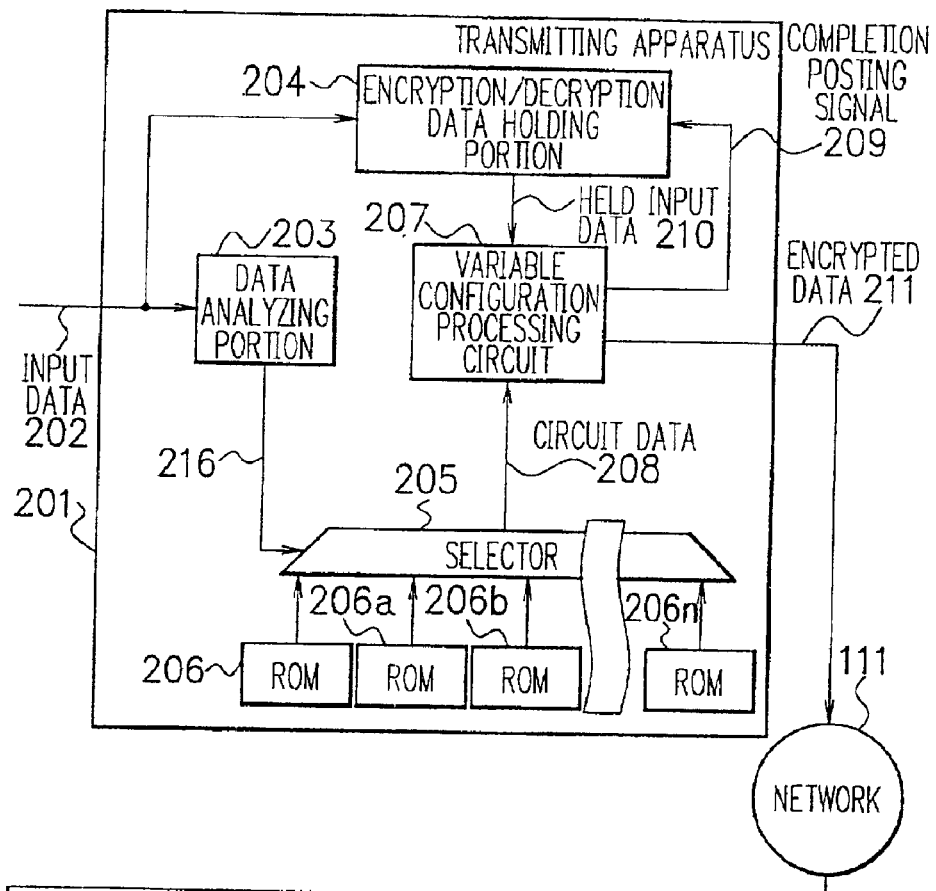
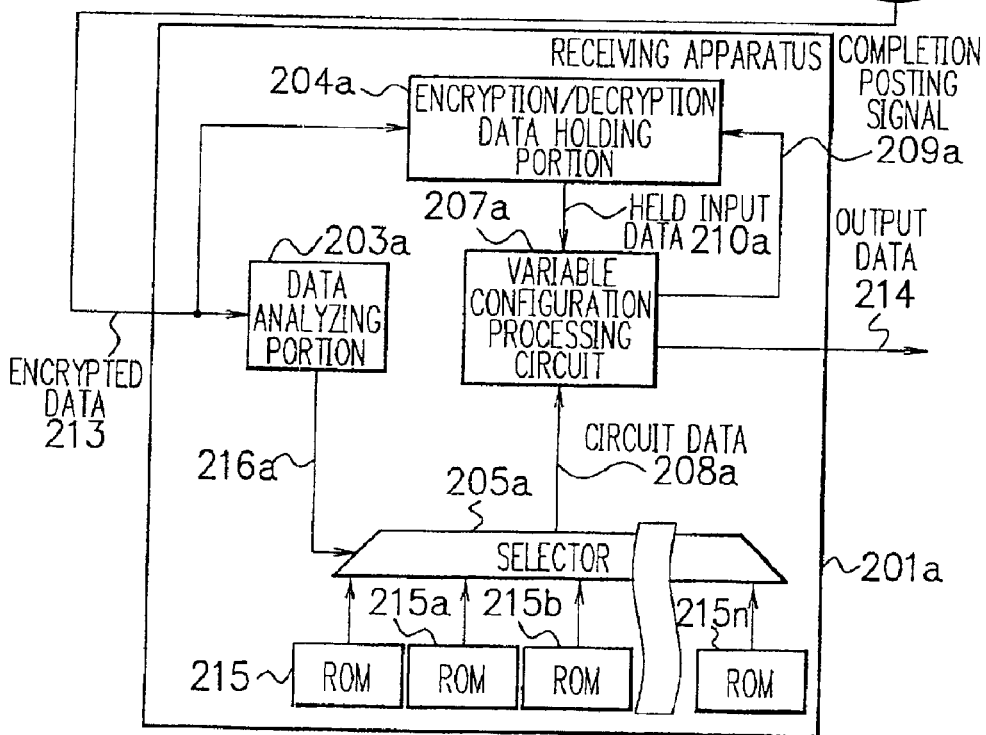

F I G. 5
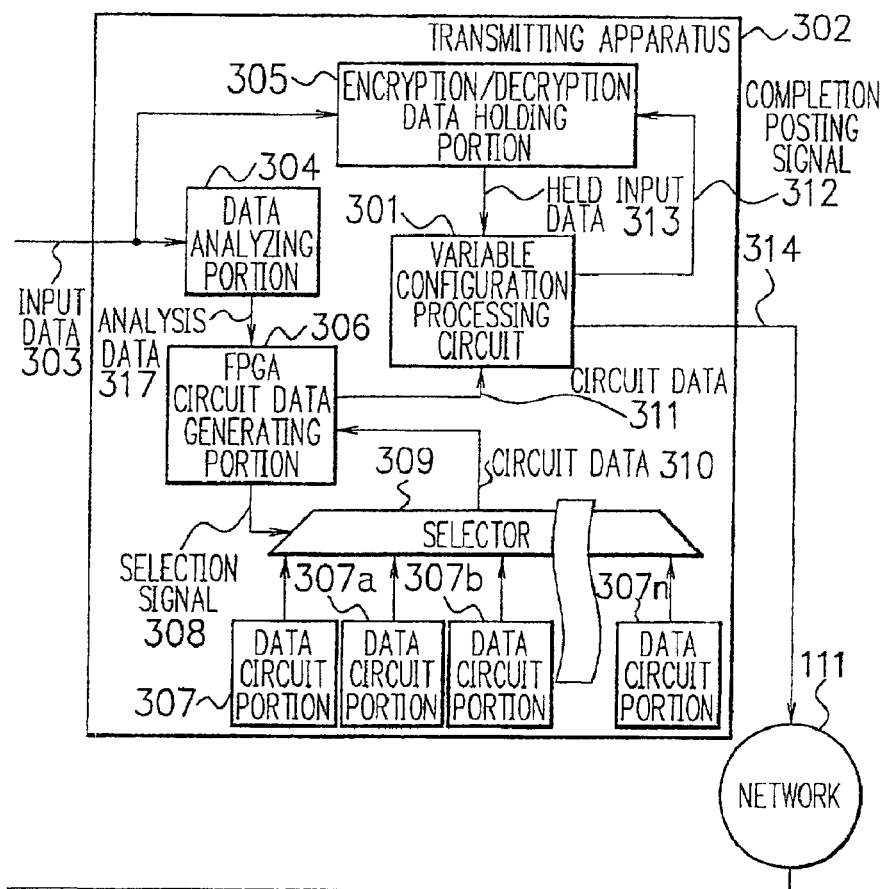
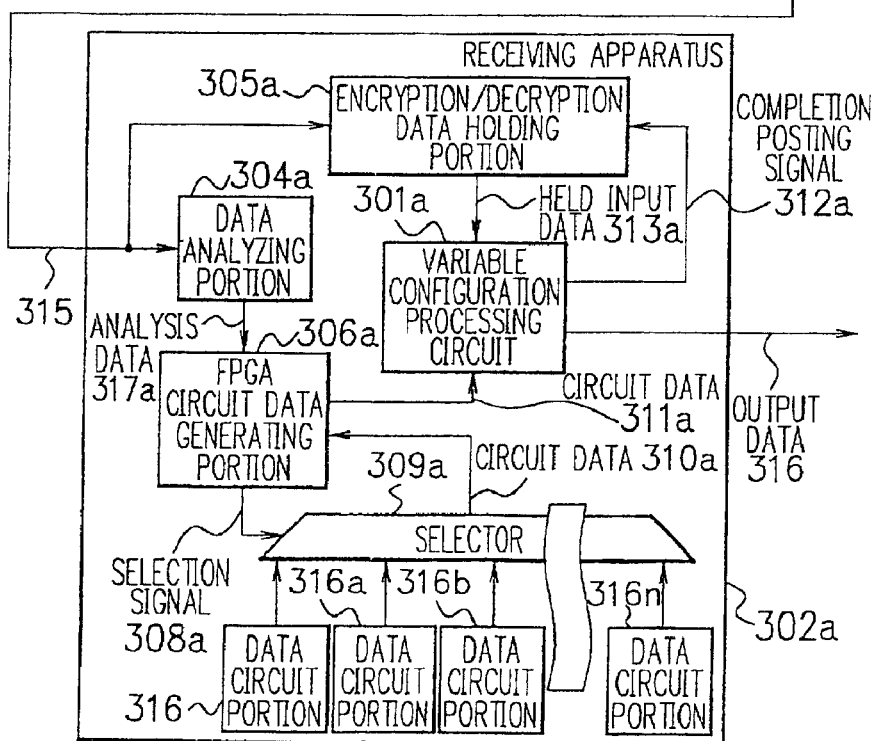

F I G. 10
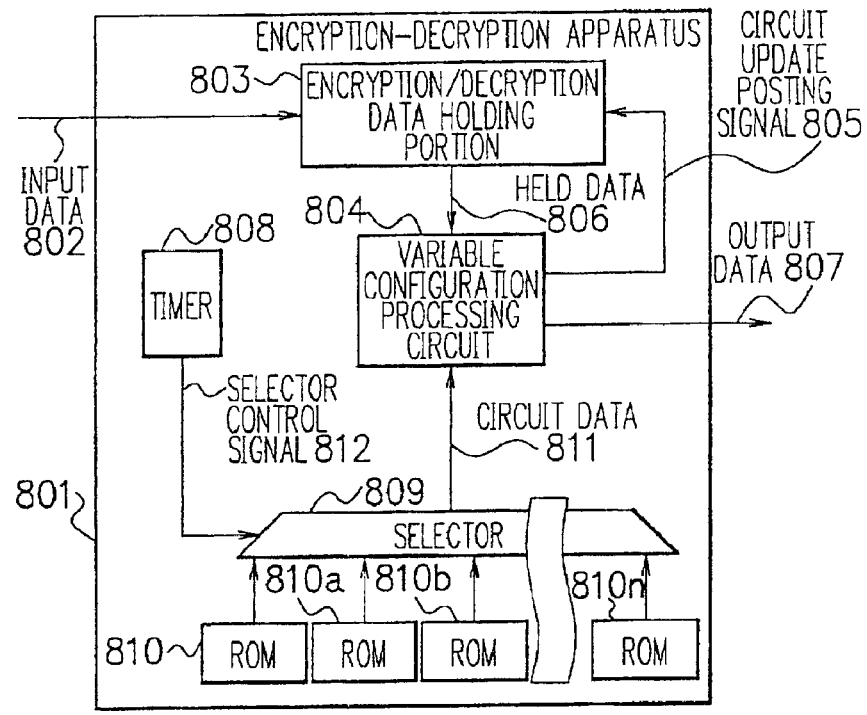
F I G. 11
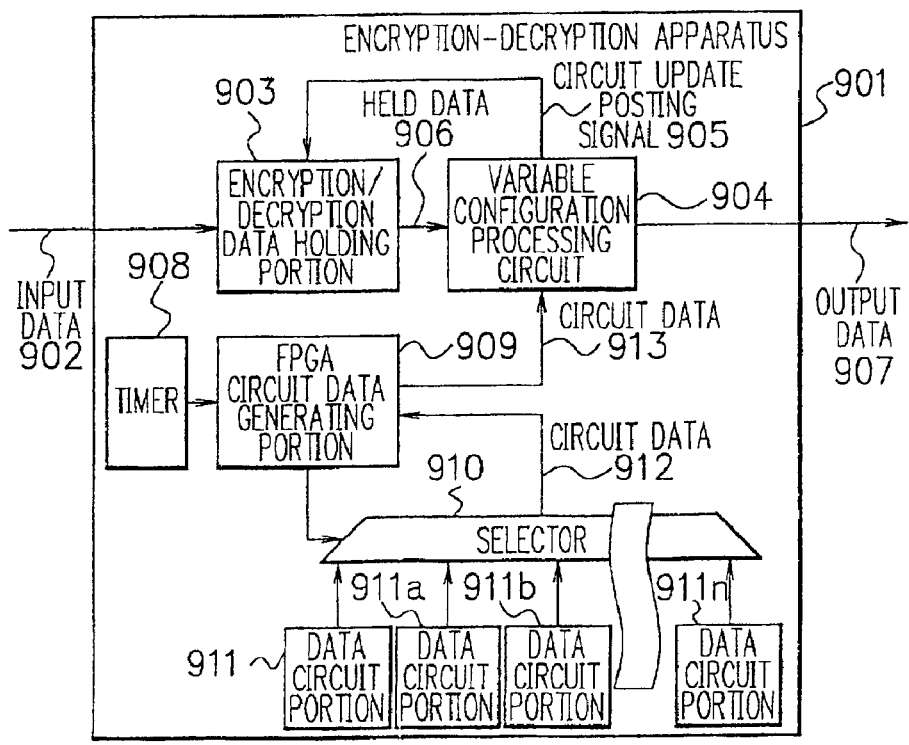

ENCRYPTION-DECRYPTION APPARATUS

BACKGROUND OF THE INVENTION

The present invention relates to an encryption-decryption apparatus. In particular, the invention relates to an encryption-decryption apparatus with a variable cryptographic algorithm.

PRIOR ART

In recent years, a method for radio communication such as portable cellular phone has rapidly been developed. Thus, a security system is required to avoid leakage of communication data by tapping (eavesdropping) or the like. For this purpose, in a general method, the communication data is encrypted for transmission. In an encryption-decryption apparatus, encryption and decryption are carried out by repeatedly performing an operation on a secret key and the communication data according to a predetermined algorithm. Therefore, it is possible to enhance difficulty of cryptanalysis by increasing the number of operations. However, this results in another problem of processing power. Further, since multimedia equipment have rapidly been come into widespread use, an amount of handled communication data has also rapidly been increased, resulting in a more serious problem of processing power. With the current state of the art, the operation should be executed by hardware in most of the encryption-decryption apparatus. Hence, when the secret key is changed, the hardware should inevitably be changed.

One illustrative encryption-decryption method is disclosed in Japanese Laid-open Patent Application No. Hei 5-110558 entitled "cipher processors."

This above-mentioned publication discloses a technique in which data is encrypted, a processing program for decryption of the encrypted data is partially or entirely stored in an EEPROM (Electrically Erasable Programmable ROM), and the program in the EEPROM can partially and entirely be updated through external communication means even if the data is decrypted in an unauthorized manner.

The prior-art encryption-decryption apparatus, however, has drawbacks in that the communication data can easily be decrypted only when the contents of operation in the algorithm are leaked or descrambled, and a descrambling method can be found in a relatively brief period of time since the operation is always repeated according to the same algorithm.

Further, there are drawbacks in that a change in encryption-decryption algorithm needs redesigning of the hardware, for which demand can not be met quickly, and update of the program by the external communication means creates the risk of leakage of encryption-decryption program data.

SUMMARY OF THE INVENTION

In view of the foregoing problems, it is an object of the present invention to provide an encryption-decryption apparatus in which all operations for encryption-decryption are rapidly performed by hardware, and a change can be made in hardware for an encryption-decryption algorithm.

According to the present invention as claimed in claim 1, for achieving the above-mentioned object, there is provided an encryption-decryption apparatus for encryption of data and decryption of encrypted data. In the encryption-decryption apparatus including a variable configuration circuit arrangement as an encryption-decryption circuit, an encryption-decryption operation is performed by using circuit data of the variable configuration circuit arrangement as a secret key.

According to the present invention as claimed in claim 2, there is provided an encryption-decryption apparatus including a plurality of circuit data of the variable configuration circuit arrangement, in which an encryption-decryption operation is performed according to different types of algorithms by feeding after selecting the circuit data of the variable configuration circuit arrangement from circuit data selection information for encryption-decryption.

According to the present invention as claimed in claim 3, there is provided an encryption-decryption apparatus including a transmitting apparatus to encrypt input data to output encrypted data, a network to transmit the encrypted data, and a receiving apparatus to take as input the encrypted data transmitted through the network, perform a decryption operation, and send output data obtained by the decryption, in which the transmitting apparatus includes a variable configuration processing circuit for encryption, and a read-only memory (ROM) to output circuit data serving as a secret key to the variable configuration processing circuit, and the receiving apparatus including a variable configuration processing circuit for decryption, and a read-only memory (ROM) to output circuit data serving as a secret key to the variable configuration processing circuit.

According to the present invention as claimed in claim 4, there is provided an encryption-decryption apparatus including a transmitting apparatus to encrypt input data to output encrypted data, a network to transmit the encrypted data, and a receiving apparatus to take as input the encrypted data transmitted through the network, perform a decryption operation, and send output data obtained by the decryption, in which the transmitting apparatus has:

a data analyzing portion to analyze information of the input data according to a predetermined instruction, and output updating information after decoding;

a plurality of ROMs in which circuit data used for specification of a cryptographic algorithm is stored;

a selector to select the plurality of ROMs according to an instruction in the updating information, and cause the selected ROM to send circuit data for encryption;

a variable configuration processing circuit to update an own internal circuit depending upon the circuit data used for specification of the cryptographic algorithm according to selection of the ROM, output a completion posting signal when the update of the internal circuit is completed, and send to the network encrypted data obtained by encryption of held input data; and an encryption/decryption data holding portion to receive the completion posting signal, and output as the held input data the input data which has been held therein to the variable configuration processing circuit for encryption, and the receiving apparatus having:

a data analyzing portion to analyze according to a predetermined instruction information of the encrypted data input from the network, and output updating information after decoding;

a plurality of ROMs in which circuit data used for specification of a cryptographic algorithm is stored;

a selector to select the plurality of ROMs according to an instruction in the updating information, and cause the selected ROM to send circuit data for decryption;

a variable configuration processing circuit to update an own internal circuit for decryption depending upon the circuit data used for specification of the cryptographic algorithm according to selection of the ROM, output a completion posting signal when the update of the internal circuit is completed, and send decrypted output data obtained by decryption of encrypted data of the held input data; and an encryption/decryption data holding portion to receive the completion posting signal, and output as the held input data the encrypted data which has been held therein to the variable configuration processing circuit for decryption.

According to the present invention as claimed in claim 5, there is provided an encryption-decryption apparatus including a transmitting apparatus to encrypt input data to output encrypted data, a network to transmit the encrypted data, and a receiving apparatus to take as input the encrypted data transmitted through the network, perform a decryption operation, and send output data obtained by the decryption, in which the transmitting apparatus has:

a data analyzing portion to analyze information of the input data according to a predetermined instruction, and output analysis information;

a plurality of data circuit portions to hold circuit data used for specification of a cryptographic algorithm;

a Field Programmable Gate Array (hereinafter abbreviated to as FPGA) circuit data generating portion to output a selection signal depending upon the analysis data from the data analyzing portion, take as input first circuit data for update of a circuit configuration, and generate and output second circuit data;

a selector to select the plurality of circuit data according to an instruction of the selection signal, and output the first circuit data for encryption to the FPGA circuit data generating portion depending upon the selected circuit data;

a variable configuration processing circuit to update an own internal circuit depending upon the second circuit data output from the FPGA circuit data generating portion, output a completion posting signal when the update of the internal circuit is completed, and send to the network encrypted data obtained by encryption of held input data; and an encryption/decryption data holding portion to receive the completion posting signal, and additionally output as the held input data the input data which has been held therein to the variable configuration processing circuit, and the receiving apparatus having:

a data analyzing portion to analyze according to a predetermined instruction information of the encrypted data input from the network, and output analysis data;

a plurality of FPGA circuit data generating portions to output a selection signal depending upon the analysis data from the data analyzing portion, take as input first circuit data for update of a circuit configuration, and generate and output second circuit data;

a plurality of data circuit portions to hold circuit data used for specification of a cryptographic algorithm;

a selector to select the plurality of circuit data according to an instruction in the selection signal, and output to the FPGA circuit data generating portion the first circuit data used for decryption depending upon the selected circuit data;

a variable configuration processing circuit to update an own internal circuit for decryption depending upon the second circuit data output from the FPGA circuit data generating portion, output a completion posting signal when the update of the internal circuit is completed, and send decrypted output data obtained by decryption of encrypted data of held input data; and an encryption/decryption data holding portion to receive the completion posting signal, and additionally output as the held input data the input data which has been held therein to the variable configuration processing circuit.

According to the present invention as claimed in claim 6, there is provided an encryption-decryption apparatus in which the transmitting apparatus has:

an encryption/decryption data holding portion to take as input and hold the input data, and receive the completion posting signal to output as held data the input data which has been held therein;

a flash ROM in which data of a cryptographic algorithm is stored; and a variable configuration processing circuit to take as input the input data, output first circuit data to the flash ROM, update data in the flash ROM by the first circuit data, take as input second circuit data from the flash ROM when the update is completed to update an own internal circuit, output the completion posting signal to the encryption/decryption data holding portion after the internal circuit is updated, and send output data obtained by encryption of the held data, and the receiving apparatus having:

an encryption/decryption data holding portion to take as input and hold the encrypted output data, and receive the completion posting signal to output as held data the output data which has been held therein;

a flash ROM in which data of a cryptographic algorithm is stored; and a variable configuration processing circuit to take as input the encrypted output data, output first circuit data to the flash ROM, update data in the flash ROM by the first circuit data, take as input second circuit data from the flash ROM after the update is completed to update an own internal circuit, output the completion posting signal to the encryption/decryption data holding portion after the internal circuit is updated, and send output data obtained by decryption of the held data.

According to the present invention as claimed in claim 7, there is provided an encryption-decryption apparatus in which the transmitting apparatus has:

a circuit data extracting portion to take as input the input data, and generate and output circuit data;

an encryption/decryption data holding portion to hold the input data until a circuit is completely updated, and receive a completion posting signal to output as held data the input data which has been held therein; and a variable configuration processing circuit to update the circuit for encryption by using the circuit data, output the completion posting signal to the encryption/decryption data holding portion when the circuit is completely updated, and send output data obtained by encryption through an updated circuit configuration, and the receiving apparatus having:

a circuit data extracting portion to take as input the encrypted output data, and generate and output circuit data;

an encryption/decryption data holding portion to hold the output data until the circuit is completely updated, and receive a completion posting signal to output as held data the encrypted output data which has been held therein; and a variable configuration processing circuit to update a circuit for decryption by using the circuit data, output the completion posting signal to the encryption/decryption data holding portion after the circuit is completely updated, and send output data obtained by decryption through an updated circuit configuration.

According to the present invention as claimed in claim 8, there is provided an encryption-decryption apparatus in which the transmitting apparatus has:

an encryption/decryption data holding portion to take as input and hold the input data, and take as input a circuit update posting signal to output as held data the input data which has been held therein;

a random generator to generate an encryption code;

a data analyzing portion to make a decision as to whether the input data is data to be encrypted or data to be decrypted, and output analysis data used to instruct to enable data from the random generator in the case of data to be encrypted or instruct to enable a secret key in the case of data to be decrypted;

an FPGA circuit data generating portion to generate and output first circuit data according to the posted analysis data;

a plurality of ROMs in which data used for specification of a cryptographic algorithm is stored;

a selector to take circuit data from the plurality of ROMs depending upon the first circuit data, and output second circuit data used for specification of a cryptographic algorithm; and a variable configuration processing circuit to take as input the second circuit data to output the circuit update posting signal so as to stop output of the held data from the encryption/decryption data holding portion, update an own internal circuit for encryption by the second circuit data, stop the circuit update posting signal when the update is completed, and resume output of the held data to output the encrypted output data, and the receiving apparatus having:

an encryption/decryption data holding portion to take as input and hold the encrypted output data, and take as input a circuit update posting signal to output as held data the output data which has been held therein;

a random generator to generate an encryption code;

a data analyzing portion to make a decision as to whether the encrypted output data is data to be encrypted or data to be decrypted, and output analysis data to instruct to enable data from the random generator in the case of data to be encrypted or instruct to enable a secret key in the case of data to be decrypted;

an FPGA circuit data generating portion to generate and output first circuit data according to the posted analysis data;

a plurality of ROMs in which data used for specification of a cryptographic algorithm is stored;

a selector to take circuit data from the plurality of ROMs depending upon the first circuit data, and output second circuit data used for specification of a cryptographic algorithm; and a variable configuration processing circuit to take as input the second circuit data to output the circuit update posting signal so as to stop output of the held data from the encryption/decryption data holding portion, update an own internal circuit for decryption by the second circuit data, stop the circuit update posting signal when the update is completed, and resume output of the held data to output the decrypted output data.

According to the present invention as claimed in claim 9, there is provided an encryption-decryption apparatus in which the plurality of ROMs data are data from a plurality of data circuits implemented via hardware, the selector outputting circuit data as first circuit data to the FPGA circuit data generating portion, and the FPGA circuit data generating portion outputting second circuit data to the variable configuration processing circuit.

According to the present invention as claimed in claim 10, there is provided an encryption-decryption apparatus in which the transmitting apparatus has:

an encryption/decryption data holding portion to take as input and hold the input data, and take as input a circuit update posting signal to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to receive the circuit data to output the circuit update posting signal, stop output of the held data, update an own internal circuit configuration depending upon the circuit data, stop the circuit update posting signal when the update is completed so as to resume output of the held data from the encryption/decryption data holding portion, and take as input the held data to perform an encryption operation through an updated internal circuit configuration so as to send encrypted output data, and the receiving apparatus having:

an encryption/decryption data holding portion to take as input and hold the encrypted output data, and take as input a circuit update posting signal so as to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to output the circuit update posting signal in response to the circuit data so as to stop output of the held data, update an own internal circuit configuration depending upon the circuit data, stop the circuit update posting signal when the update is completed so as to resume output of the held data from the encryption/decryption data holding portion, and take as input the held data to perform a decryption operation through an updated internal circuit configuration so as to send decrypted output data.

According to the present invention as claimed in claim 11, there is provided an encryption-decryption apparatus in which the plurality of ROMs data are data from a plurality of data circuit portions implemented via hardware, the random generator being a timer to generate and output a selector control signal at regular intervals, the selector outputting circuit data as first circuit data to the FPGA circuit data generating portion, and the FPGA circuit data generating portion outputting second circuit data to the variable configuration processing circuit.

According to the present invention as claimed in claim 12, there is provided an encryption-decryption apparatus in which the variable configuration processing circuit is a Field Programmable Gate Array (FPGA).

BRIEF DESCRIPTION OF THE DRAWINGS

FIG. 2 is a detailed block diagram showing one illustrative encryption-decryption apparatus of the present invention;

FIG. 5 is a detailed block diagram showing a second embodiment of an encryption-decryption apparatus of the present invention;

FIG. 10 is a block diagram showing a seventh embodiment of an encryption-decryption apparatus of the present invention;

FIG. 11 is a block diagram showing an eighth embodiment of an encryption-decryption apparatus of the present invention;

DESCRIPTION OF THE PREFERRED EMBODIMENTS

A description will now be given of embodiments of the present invention referring to the accompanying drawings.

Figure 1:
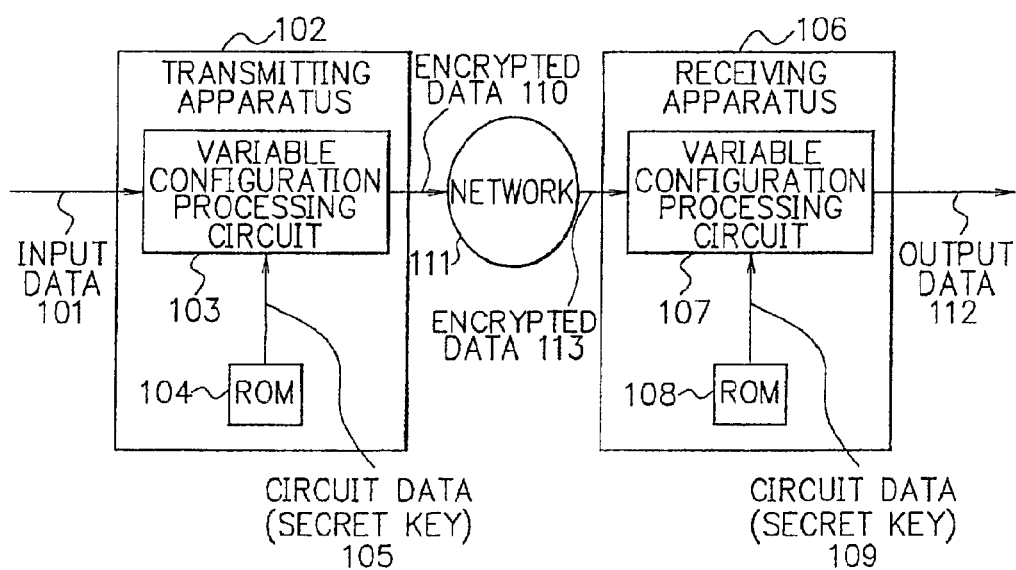
FIG. 1 is a block diagram showing one embodiment of an encryption-decryption apparatus of the present invention.

FIG. 1 is a block diagram showing one embodiment of an encryption-decryption apparatus of the present invention.

In the embodiment shown in FIG. 1, the encryption-decryption apparatus includes a transmitting apparatus 102 to encrypt input data 101 and output encrypted data 110, a network 111 to transmit the encrypted data 110, and a receiving apparatus 106 to take as input encrypted data 113 transmitted through the network 111, and send output data 112 obtained by decryption.

Here, the transmitting apparatus 102 has the a variable configuration processing circuit 103 for encryption, and a ROM 104 including a read-only memory to output circuit data 105 (secret key) to the variable configuration processing circuit 103. The receiving apparatus 106 has a variable configuration processing circuit 107 for decryption, and a ROM 108 including a read-only memory to output circuit data 109 (secret key) to the variable configuration processing circuit 107.

In view of specific circuit element, an FPGA (Field Programmable Gate Array) can be employed as the above variable configuration processing circuits 103, 107. It is thereby possible to easily realize any desired circuit configuration by updating program data.

The operation will now be described infra.

The input data 101 is encrypted by the variable configuration processing circuit 103, and the encrypted data 110 is fed to the general network 111. The receiving apparatus 106 takes as input the encrypted data 113 from the network 111. The encrypted data 113 is decrypted in the variable configuration processing circuit 107 for decryption and is sent out as the output data 112.

When the secret key should be changed, the ROM 104 may be replaced to an another ROM 104 and the variable configuration processing circuit 103 may be updated by new secret key (data) input in the another ROM. That is, a new ROM 104 (the another ROM) outputs to the variable configuration processing circuit 103 the circuit data 105 to generate a new encryption algorithm so as to update a circuit configuration of the variable configuration processing circuit 103. As a result, the variable configuration processing circuit 103 outputs the encrypted data 110 obtained by encryption of the input data 101 in a new format. Corresponding to the encrypted data 110 in the new format, in the receiving apparatus 106, a circuit configuration of the variable configuration processing circuit 107 may also be updated by using a new ROM 108. It is thereby possible to perform decryption of the encrypted data 113 in the new format.

In other words, the circuit configurations of the variable configuration processing circuits 103, 107 are updated by the circuit data 105, 109 output from the replaceable ROMs 104, 108.

As set forth above, the transmitting apparatus 102 has the variable configuration processing circuit 103 for encryption and the ROM 104 in which the circuit data 105 is stored. When the transmitting apparatus 102 is started, the ROM 104 outputs the circuit data 105 to the variable configuration processing circuit 103 for encryption. The circuit data 105 provides the variable configuration processing circuit 103 for encryption with a new circuit configuration, and thereafter the variable configuration processing circuit 103 can sequentially encrypt the input data 101. To the network 111 is sent out the encrypted data 110 obtained by encryption in the variable configuration processing circuit 103 for encryption.

Similarly, the receiving apparatus 106 has the variable configuration processing circuit 107 for decryption and the ROM 108 in which the circuit data 109 is stored. When the receiving apparatus 106 is started, the ROM 108 outputs the circuit data 109 to the variable configuration processing circuit 107 for decryption. The circuit data 109 provides the variable configuration processing circuit 107 for decryption with a new circuit configuration, and thereafter the variable configuration processing circuit 107 can sequentially decrypt the encrypted data 113. The variable configuration processing circuit 107 decrypts the encrypted data 113 received from the network 111, and generates and outputs the output data 112.

When the secret key should be changed, the ROM 104 and ROM 108 may be replaced to respectively generate the updating data for the variable configuration processing circuit 103 for encryption and the variable configuration processing circuit 107 for decryption. The generated circuit data 105, 109 are output to the variable configuration processing circuit 103 for encryption and the variable configuration processing circuit 107 for decryption to update the circuit configurations, thereby enabling encryption and decryption in the new format.

FIG. 2 is a detailed block diagram showing an illustrative example encryption-decryption apparatus of the present invention.

In FIG. 2, the same reference numerals are used for component parts corresponding to those shown in FIG. 1, and descriptions thereof are omitted.

Referring to FIG. 2, the encryption-decryption apparatus includes a transmitting apparatus 201 to encrypt input data 202 and output encrypted data 211, a network 111 to transmit the encrypted data 211, and a receiving apparatus 201a to take as input encrypted data 213 transmitted through the network 111 and send output data 214 obtained by decryption.

Here, the input data 202 input into the transmitting apparatus 201 is a signal to which updating information is added according to a predetermined instruction.

The input data 202 is input into a data analyzing portion 203 and an encryption/decryption data holding portion 204. The data analyzing portion 203 analyzes information according to a predetermined instruction, and decodes the information to output updating information 216 to a selector 205. The selector 205 selects ROMs 206, 206a, 206b, . . . , and 206n according to an instruction in the updating information 216, and sends circuit data 208 to a variable configuration processing circuit 207 for encryption. An internal circuit of the variable configuration processing circuit 207 for encryption is updated on the basis of the circuit data 208. In the update, cryptographic algorithm can be determined by the selection of the ROMs. When the circuit configuration is completely updated in the variable configuration processing circuit 207 for encryption, the variable configuration processing circuit 207 outputs a completion posting signal 209 to the encryption/decryption data holding portion 204. In response to reception of the completion posting signal 209, the encryption/decryption data holding portion 204 outputs to the variable configuration processing circuit 207 for encryption as held input data 210 the input data 202 which has been held therein. Thus, the variable configuration processing circuit 207 encrypts the input data 202, and sends the encrypted data 211 to the network 111.

The encrypted data 213 is input from the network 111, and is sent to a data analyzing portion 203a and an encryption/decryption data holding portion 204a. The data analyzing portion 203a analyzes information according to a predetermined instruction, and decodes the information to output updating information 216a to a selector 205a. The selector 205a selects ROMs 215, 215a, 215b, and 215n according to an instruction in the updating information 216a, and sends circuit data 208a to a variable configuration processing circuit 207a for decryption. In the variable configuration processing circuit 207a for decryption, an internal circuit of the variable configuration processing circuit 207a for decryption is updated on the basis of the circuit data 208a. When the circuit configuration is completely updated in the variable configuration processing circuit 207a for decryption, the variable configuration processing circuit 207a outputs a completion posting signal 209a to the encryption/decryption data holding portion 204a. In response to reception of the completion posting signal 209a, the encryption/decryption data holding portion 204a outputs to the variable configuration processing circuit 207 for decryption as held input data 210a the encrypted data 213 which has been held therein. Thus, the variable configuration processing circuit 207a decrypts the encrypted data 213 to send the output data 214.

Figure 3:
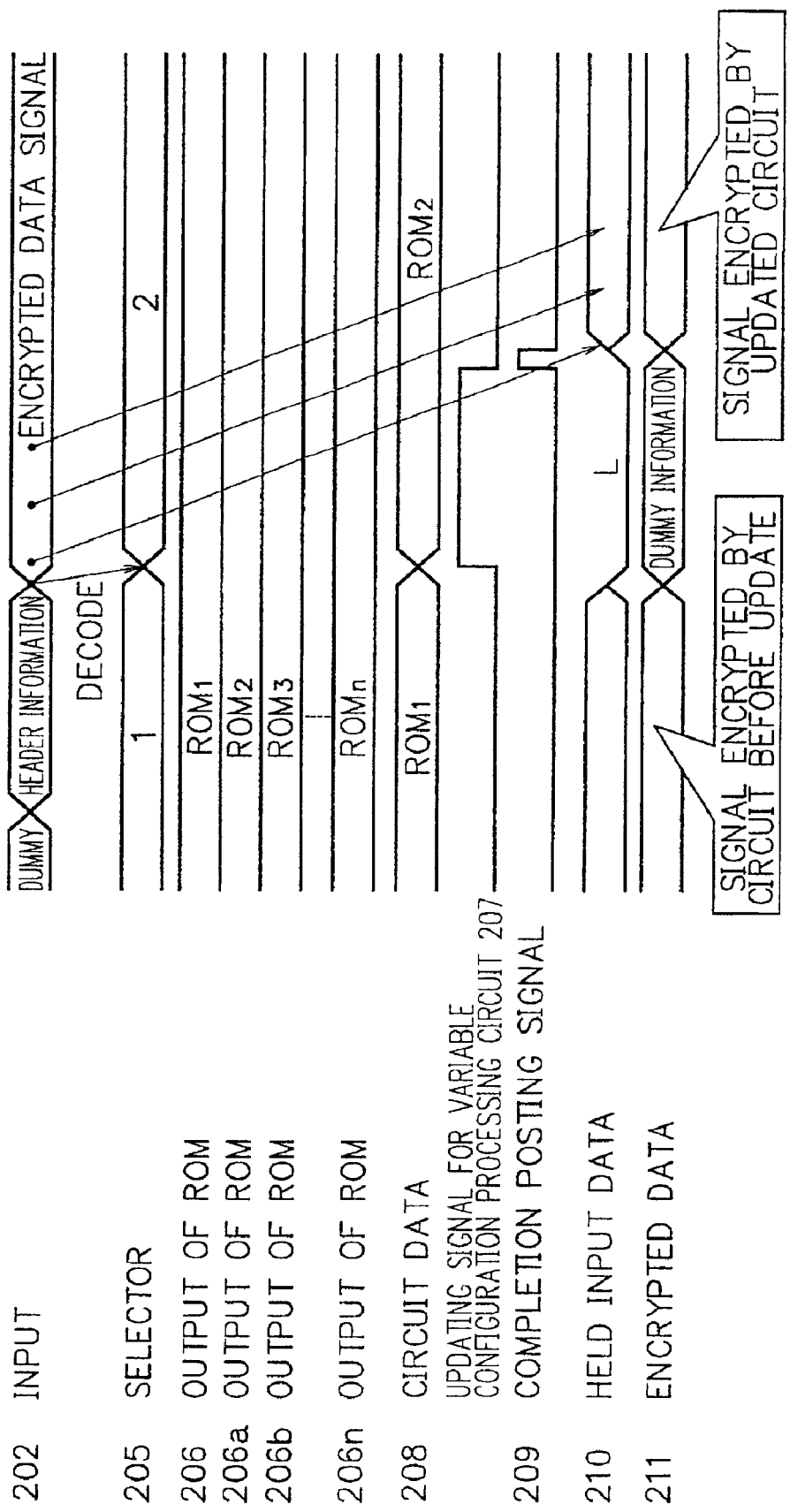
FIG. 3 is a time chart showing an operation of FIG. 2.

FIG. 3 is a time chart showing an operation of FIG. 2.

The operation of the embodiment will now be described in more detail with reference to FIGS. 2 and 3.

The input data 202 contains header information and a data signal to be encrypted. The data analyzing portion 203 extracts the updating information 216 from the input data 202, and decodes data in the updating information 216 to control the selector 205.

This enables switching of data in the ROMs 206, 206a, 206b, and 206n to generate the circuit data 208. Concurrently with the switching of the data in the ROM, an updating signal is generated for the variable configuration processing circuit 207, and the variable configuration processing circuit 207 for encryption is initialized at a leading edge of the updating signal for the variable configuration processing circuit 207. The variable configuration processing circuit 207 for encryption updates its circuit configuration according to the circuit data 208, and outputs the completion posting signal 209 when the update is completed. The encryption/decryption data holding portion 204 holds the input data 202 until the completion posting signal 209 is received. In response to reception of the completion posting signal 209, the encryption/decryption data holding portion 204 sends the held data 210 which has been held, in the order of input, to the variable configuration processing circuit 207 for encryption. The variable configuration processing circuit 207 for encryption carries out encryption of the held data 210 to generate and output the encrypted data 211.

Figure 4:
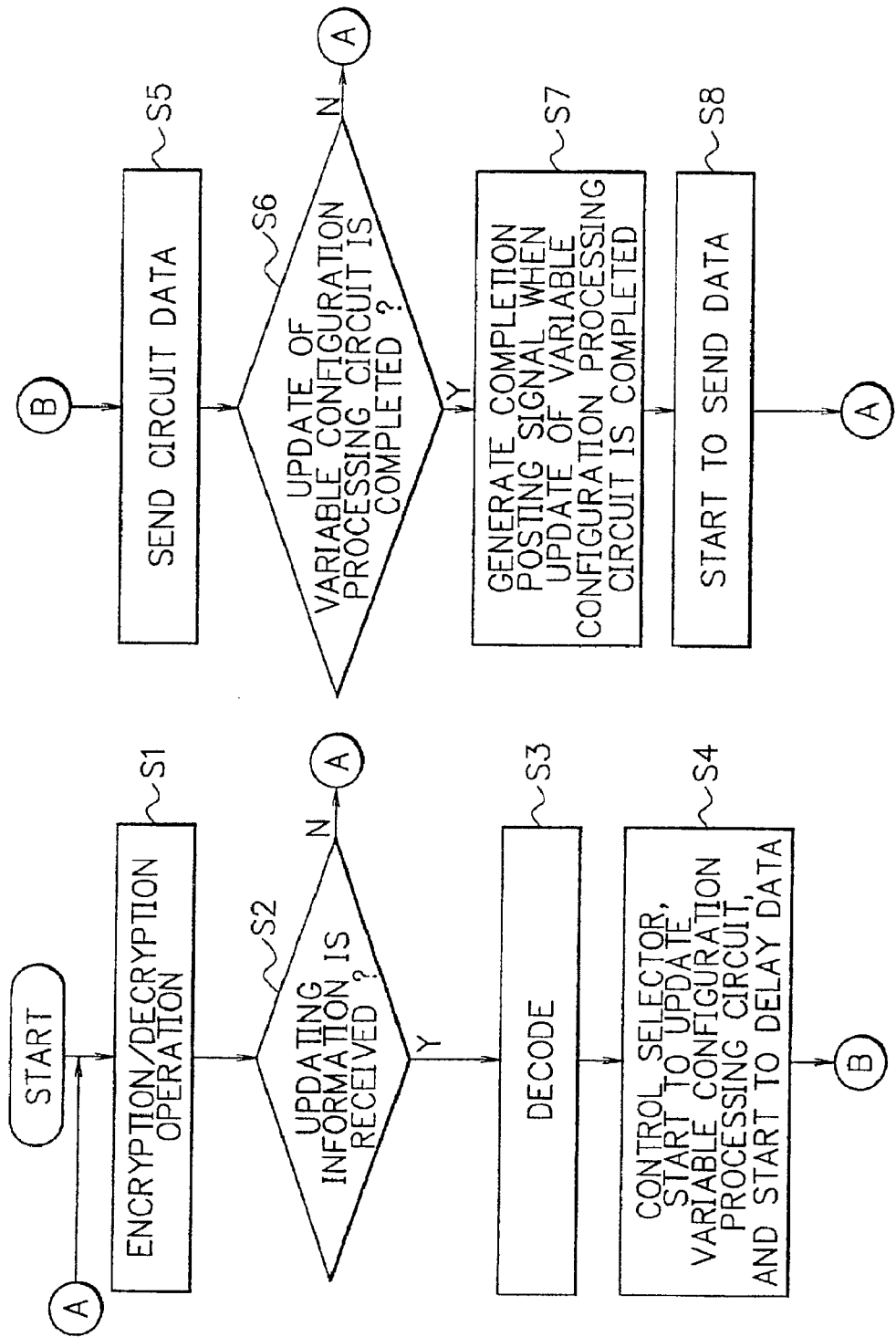
FIG. 4 is a flowchart showing an entire operation of FIG. 2.

FIG. 4 is a flowchart showing an entire operation of FIG. 2.

In response to reception of the input data 202, the process performs an encryption/decryption operation (Step 1: S1).

In Step 2 (S2), it is decided whether or not the updating information 216, 216a are received. Until the updating information 216, 216a are received, the process returns to Step 1 to repeat the encryption/decryption operation. When the updating information are received in Step 2, the received updating information 216, 216a are decoded (Step 3: S3).

Subsequently, the selectors 205, 205a are controlled to send the updating signals to the variable configuration processing circuits 207, 207a for encryption/decryption, and cause the encryption/decryption data holding portions 204, 204a to hold the data (Step 4: S4). Thereafter, the circuit data selected by the selectors 205, 205a are sent to the variable configuration processing circuits 207, 207a for encryption/decryption (Step 5: S5). In the next Step 6 (S6), it is decided whether or not the updates of the variable configuration processing circuits 207, 207a for encryption/decryption are completed. When not completed, the process returns to Step 1 (S1). When completed, the process proceeds to Step 7 (S7) to generate the completion posting signals 209, 209a, thereby resetting the updating signals for the variable configuration processing circuits 207, 207a for encryption/decryption. Further, data transmission is started, that is, the signals held in the encryption/decryption data holding portions 204, 204a are sent to the variable configuration processing circuits 207, 207a for encryption/decryption (Step 8: S8).

This enables the cryptographic communication in which data can be decrypted only by a transmitter/receiver having the circuit data because the circuit data 208, 208a serve as the secret keys as set forth above. Hence, it is possible to enhance security. In addition, since the plurality of ROM data are provided, the secret key can be updated for each communication. As a result, for one data are prepared different types of encryptions through the plurality of circuit configurations. Since the circuit data serves as the secret key, it is difficult to provide an equivalent circuit configuration even if the secret key is leaked. Therefore, it is possible to realize a more sophisticated cryptographic circuit configuration.

FIG. 5 is a detailed block diagram showing a second embodiment of an encryption-decryption apparatus of the present invention.

In FIG. 5, the same reference numerals are used for component parts corresponding to those shown in FIG. 2, and descriptions thereof are omitted.

Referring to FIG. 5, the encryption-decryption apparatus includes a transmitting apparatus 302 to encrypt input data 303 and output encrypted data 314, a network 111 to transmit the encrypted data 314, and a receiving apparatus 302a to take as input encrypted data 315 transmitted through the network 111 and send output data 316 obtained by decryption.

Here, the input data 303 input into the transmitting apparatus 302 is a transmit/receive signal to which updating information is added according to a predetermined instruction. The input data 303 is sent to a data analyzing portion 304 and an encryption/decryption data holding portion 305. The data analyzing portion 304 analyzes information according to a predetermined instruction, and sends analysis data 317 to an FPGA circuit data generating portion 306. As described above, FPGA is an abbreviation for 'field programmable gate array.' The FPGA circuit data generating portion 306 generates circuit data used to update a circuit configuration of a variable configuration processing circuit 301.

The FPGA circuit data generating portion 306 outputs a selection signal 308 to a selector 309 depending upon the analysis data 317 from the data analyzing portion 304, thereby selecting data circuit portions 307, 307a, 307b, and 307n. In response to the selection signal 308, the selector 309 outputs to the FPGA circuit data generating portion 306 circuit data 310 in which data are combined according to a demand in the updating information.

In the variable configuration processing circuit 301 for encryption, the circuit is updated on the basis of the circuit data 311 output from the FPGA circuit data generating portion 306. When the circuit configuration is completely updated in the variable configuration processing circuit 301, the variable configuration processing circuit 301 outputs a completion posting signal 312 to the encryption/decryption data holding portion 305. In response to the completion posting signal 312, the encryption/decryption data holding portion 305 sequentially sends the input data 303 as additional held input data 313 to the variable configuration processing circuit 301. The variable configuration processing circuit 301 receives and encrypts the held input data 313 through the updated circuit. Thus, the variable configuration processing circuit 301 carries out encryption to send the encrypted data 314 to the network 111.

The encrypted data 315 is input from the network 111, and is sent to a data analyzing portion 304a and an encryption/decryption data holding portion 305a. The data analyzing portion 304a analyzes information according to a predetermined instruction, and sends analysis data 317a to an FPGA circuit data generating portion 306a. Depending upon the analysis data 317a from the data analyzing portion 304a, the FPGA circuit data generating portion 306a sends a selection signal 308a to a selector 309a to select data circuit portions 316, 316a, 316b, 316c, and 316n. In response to the selection signal 308a, the selector 309a outputs to the FPGA circuit data generating portion 306a circuit data 310a in which data are combined according to a demand in the updating information. In the variable configuration processing circuit 301a for decryption, a circuit is updated on the basis of circuit data 311a output from the FPGA circuit data generating portion 306a. When the circuit configuration is completely updated in the variable configuration processing circuit 301a, the variable configuration processing circuit 301a outputs a completion posting signal 312a to the encryption/decryption data holding portion 305a. In response to the completion posting signal 312a, the encryption/decryption data holding portion 305a sequentially sends the input data 303a to the variable configuration processing circuit 301a as additional held input data 313a. The variable configuration processing circuit 301a receives and decrypts the held input data 313a through the updated circuit. Thus, the variable configuration processing circuit 301a carries out decryption to send output data 316.

As set forth above, in the second embodiment, instead of the ROM data from the ROM circuit, the plurality of prepared data circuit portions 307, 307a, 307b, and 307n are combined according to the updating information to form one circuit configuration.

The input data 303 input into the transmitting apparatus 302 is the signal to which the updating information is added according to the predetermined instruction. The input data 303 is sent to the data analyzing portion 304 and the encryption/decryption data holding portion 305. The data analyzing portion 304 analyzes the information according to the predetermined instruction, and sends the analysis data 317 to the FPGA circuit data generating portion 306. Depending upon the analysis data 317 from the data analyzing portion 304, the FPGA circuit data generating portion 306 optionally selects the data circuit portions 307, 307a, 307b, and 307n. The selection signal 308 is sent to the selector 309 to provide the circuit data 310 in which the data are combined according to the demand in the updating information, thereby generating the data for the variable configuration processing circuit 301. In the variable configuration processing circuit 301 for encryption, the circuit is updated on the basis of the circuit data 311 obtained by the combination. When the circuit configuration is completely updated in the variable configuration processing circuit 301 for encryption, the variable configuration processing circuit 301 outputs the completion posting signal 312 to the encryption/decryption data holding portion 305. In response to the completion posting signal 312, the encryption/decryption data holding portion 305 sequentially sends the input data 303 to the variable configuration processing circuit 301 for encryption. The variable configuration processing circuit 301 for encryption receives and decrypts the held input data 313 through the updated circuit. Thus, it is possible to provide different types of encryption-decryption circuit configurations by the number of different combinations of data.

Figure 6:
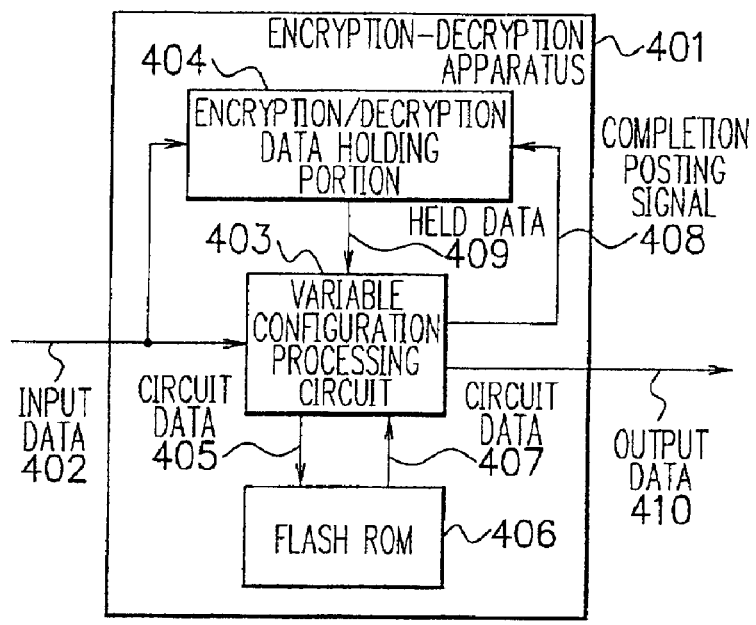
FIG. 6 is a block diagram showing a third embodiment of an encryption-decryption apparatus of the present invention.

FIG. 6 is a block diagram showing a third embodiment of an encryption-decryption apparatus of the present invention.

In the drawing, a transmitting apparatus for encryption and a receiving apparatus for decryption are not discretely shown through a network 111, but shown as one block with the term "encryption/decryption" for the sake of simplicity. The term "encryption/decryption" is read as encryption in the case of the transmitting apparatus, or is read as decryption in the case of the receiving apparatus.

Referring to FIG. 6, input data 402 input into an encryption-decryption apparatus 401 is input into a variable configuration processing circuit 403 for encryption/decryption, and is concurrently held in an encryption/decryption data holding portion 404. The variable configuration processing circuit 403 for encryption/decryption extracts circuit data 405 to update a FLASH ROM 406. When the update of the FLASH ROM 406 is completed, the variable configuration processing circuit 403 for encryption/decryption is reset to read circuit data 407 stored in the FLASH ROM 406 so as to update an internal circuit of the variable configuration processing circuit 403. After the internal circuit of the variable configuration processing circuit 403 for encryption/decryption is completely generated, the variable configuration processing circuit 403 sends a completion posting signal 408 to the encryption/decryption data holding portion 404. Then, the encryption/decryption data holding portion 404 sends held data 409 which has been held therein to the variable configuration processing circuit 403 for encryption/decryption which sends output data 410 obtained by the encryption/decryption.

In such a manner, in the present embodiment, it is possible to update a circuit configuration by using the circuit data for decision of many types of cryptographic algorithms.

Figure 7:
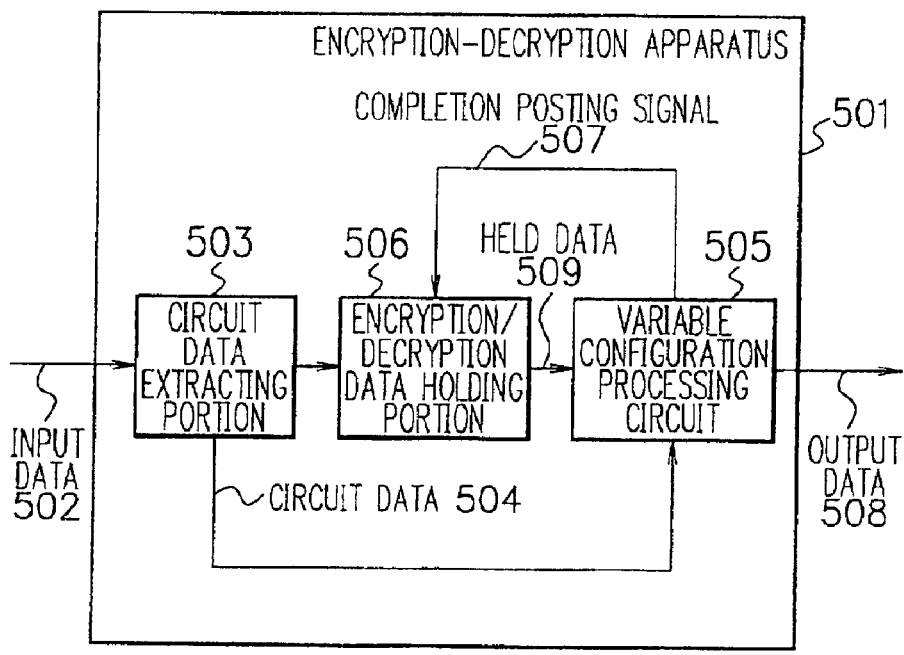
FIG. 7 is a block diagram showing a fourth embodiment of an encryption-decryption apparatus of the present invention.

FIG. 7 is a block diagram showing a fourth embodiment of an encryption-decryption apparatus of the present invention.

In the drawing, a transmitting apparatus for encryption and a receiving apparatus for decryption are not discretely shown through a network 111, but shown as one block with the term "encryption/decryption" for the sake of simplicity. The term "encryption/decryption" is read as encryption in the case of the transmitting apparatus, or is read as decryption in the case of the receiving apparatus.

Referring to FIG. 7, input data 502 input into an encryption-decryption apparatus 501 is extracted in a circuit data extracting portion 503 according to a predetermined format to generate circuit data 504. The circuit data 504 is used to update a circuit of a variable configuration processing circuit 505 for encryption/decryption. The input data 502 is held in an encryption/decryption data holding portion 506 until the update of the circuit is completed. In response to a completion posting signal 507, the encryption/decryption data holding portion 506 sends held data 509 which has been held therein to the variable configuration processing circuit 505 for encryption/decryption. Encryption/decryption of the held data 509 is performed through a new circuit configuration of the variable configuration processing circuit 505 for encryption/decryption, thereafter sending output data 508.

Figure 8:
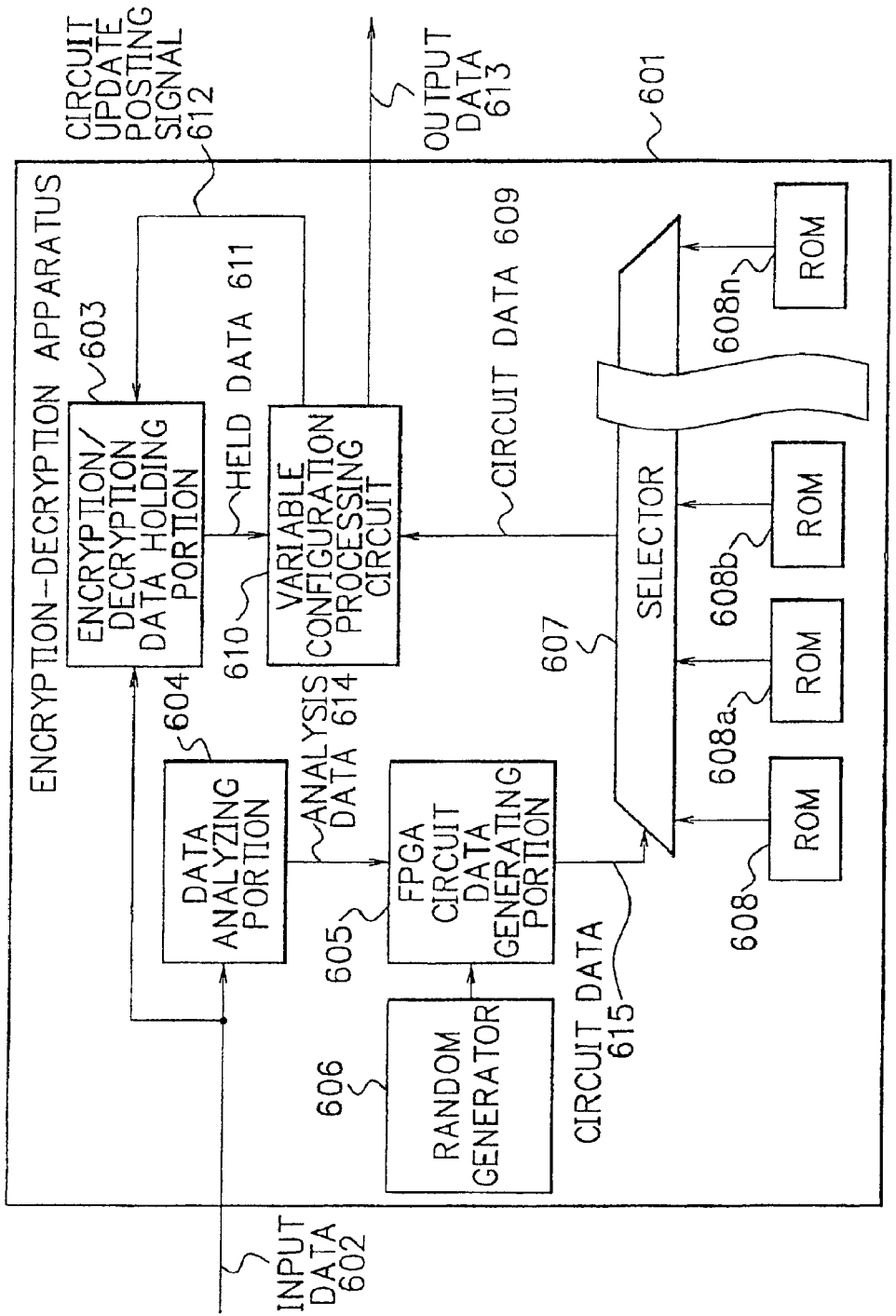
FIG. 8 is a block diagram showing a fifth embodiment of an encryption-decryption apparatus of the present invention.

FIG. 8 is a block diagram showing a fifth embodiment of an encryption-decryption apparatus of the present invention.

In the drawing, a transmitting apparatus for encryption and a receiving apparatus for decryption are not discretely shown through a network 111, but shown as one block with the term "encryption/decryption" for the sake of simplicity. The term "encryption/decryption" is read as encryption in the case of the transmitting apparatus, or is read as decryption in the case of the receiving apparatus.

Referring to FIG. 8, input data 602 input into an encryption-decryption apparatus 601 is temporarily held in an encryption/decryption data holding portion 603. It is decided in a data analyzing portion 604 whether the input data 602 is data to be encrypted or data to be decrypted. In the case of data to be encrypted, the data analyzing portion 604 instructs an FPGA circuit data generating portion 605 to enable data from a random generator 606. In the case of data to be decrypted, the data analyzing portion 604 instructs the FPGA circuit data generating portion 605 to enable a secret key extracted in the data analyzing portion 604, and outputs the extracted secret key. According to analysis data 614 posted from the data analyzing portion 604, the FPGA circuit data generating portion 605 generates circuit data 615 for a variable configuration processing circuit 610. When a signal from the random generator 606 is enabled to generate circuit data 609 for the variable configuration processing circuit 610, the FPGA circuit data generating portion 605 takes as input the signal from the random generator 606, and controls a selector 607 depending upon data of the signal. The selector 607 takes as inputs circuit data from ROMs 608, 608a, 608b, and 608n to combine the circuit data into circuit data 609. In response to the circuit data 609, the variable configuration processing circuit 610 outputs a circuit update posting signal 612 so as to stop output of held data 611 from the encryption/decryption data holding portion 603. The circuit data 609 updates an internal configuration of the variable configuration processing circuit 610 for encryption/decryption. When the update is completed, the variable configuration processing circuit 610 stops the circuit update posting signal 612 so that the encryption/decryption data holding portion 603 can additionally send the held data 611 to the variable configuration processing circuit 610. With a new circuit configuration, the variable configuration processing circuit 610 for encryption/decryption performs the encryption/decryption operation to send output data 613.

As described above, the random generator 606 is mounted to generate the updating information, thereby reducing the load imposed on the system.

Figure 9:
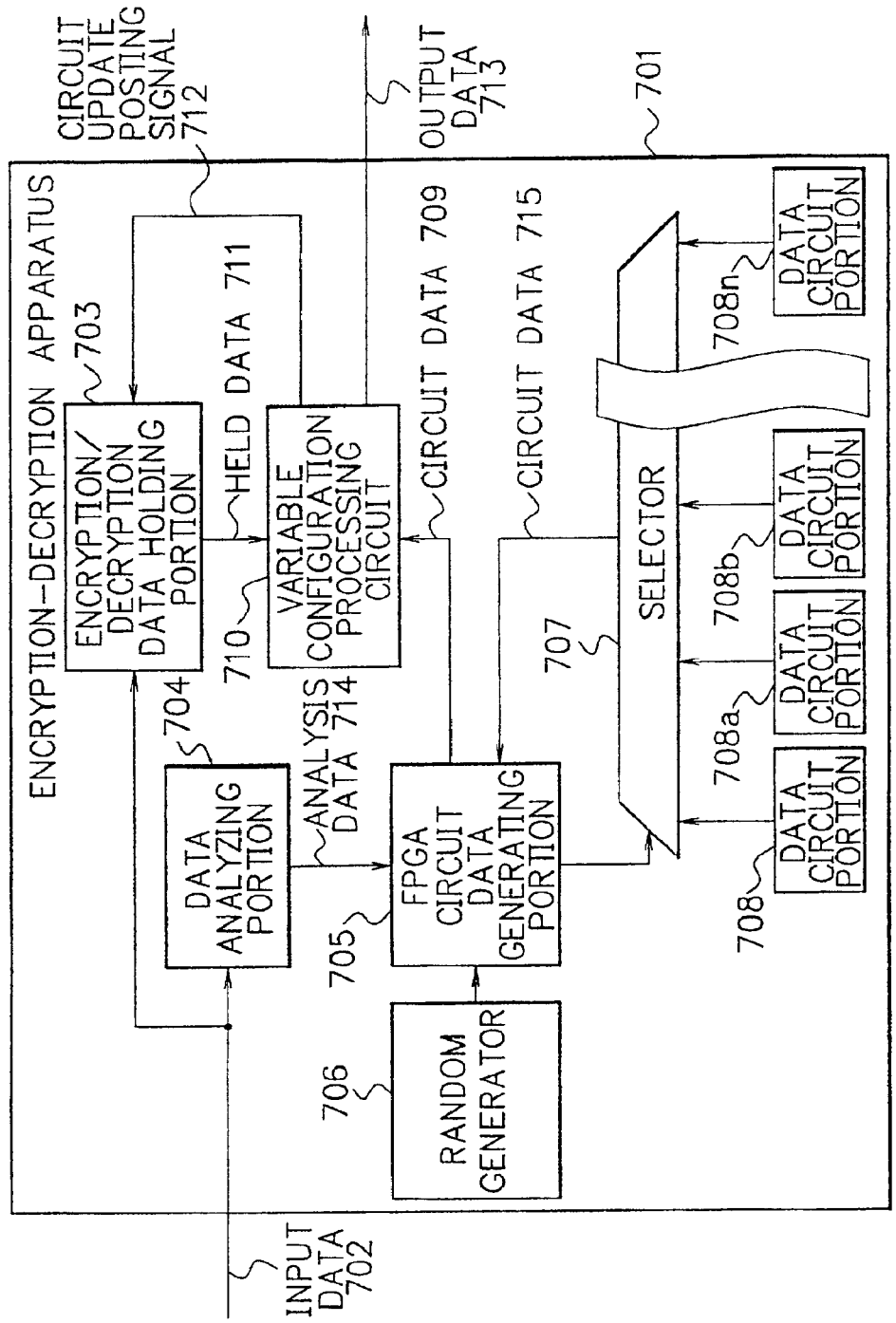
FIG. 9 is a block diagram showing a sixth embodiment of an encryption-decryption apparatus of the present invention.

FIG. 9 is a block diagram showing a sixth embodiment of an encryption-decryption apparatus of the present invention.

In the drawing, a transmitting apparatus for encryption and a receiving apparatus for decryption are not discretely shown through a network 111, but shown as one block with the term "encryption/decryption" for the sake of simplicity. The term "encryption/decryption" is read as encryption in the case of the transmitting apparatus, or is read as decryption in the case of the receiving apparatus.

Referring to FIG. 9, input data 702 input into an encryption-decryption apparatus 701 is temporarily held in an encryption/decryption data holding portion 703. It is decided in a data analyzing portion 704 whether the input data 702 is data to be encrypted or data to be decrypted. In the case of data to be encrypted, the data analyzing portion 704 instructs an FPGA circuit data generating portion 705 to enable data from a random generator 706. In the case of data to be decrypted, the data analyzing portion 704 instructs the FPGA circuit data generating portion 705 to enable a secret key extracted in the data analyzing portion 704, and outputs an extracted secret key. According to analysis data 714 posted from the data analyzing portion 704, the FPGA circuit data generating portion 705 generates circuit data for an FPGA. When a signal from the random generator 706 is enabled to generate circuit data for the FPGA, the FPGA circuit data generating portion 705 takes as input the signal from the random generator 706, and controls a selector 707 depending upon data of the signal. The selector 707 takes as inputs circuit data 715 from ROMs 708, 708a, 708b, . . . , and 708n to combine the circuit data 715 into circuit data 709. In response to the circuit data 709, the variable configuration processing circuit 710 outputs a circuit update posting signal 712 so as to stop the output of held data 711 from the encryption/decryption data holding portion 703. The circuit data 709 for the FPGA is used to update an internal configuration of the variable configuration processing circuit 710 for encryption/decryption. When the update is completed, the variable configuration processing circuit 710 stops the circuit update posting signal 712 so that the encryption/decryption data holding portion 703 can additionally send the held data 711 to the variable configuration processing circuit 710. With a new circuit configuration, the encryption/decryption of the held data 711 is performed by the variable configuration processing circuit 710 for encryption/decryption, thereafter sending output data 713. Thus, the encryption/decryption operation can be implemented via hardware to a larger extent than that in the above embodiments. It is thereby possible to minimize the load on the system, and provide a greater number of secret keys.

FIG. 10 is a block diagram showing a seventh embodiment of an encryption-decryption apparatus of the present invention.

In the drawing, a transmitting apparatus for encryption and a receiving apparatus for decryption are not discretely shown through a network 111, but shown as one block with the term "encryption/decryption" for the sake of simplicity. The term "encryption/decryption" is read as encryption in the case of the transmitting apparatus, or is read as decryption in the case of the receiving apparatus.

Referring to FIG. 10, input data 802 input into an encryption-decryption apparatus 801 is temporarily held in an encryption/decryption data holding portion 803. Unless output is stopped by a circuit update posting signal 805 from a variable configuration processing circuit 804 for encryption/decryption, the encryption/decryption data holding portion 803 continuously sends held data 806 to the variable configuration processing circuit 804 for encryption/decryption. The variable configuration processing circuit 804 for encryption/decryption receives the held data 806 from the encryption/decryption data holding portion 803, and performs an encryption/decryption operation of the held data 806 through an internal circuit configuration, thereafter sending output data 807. A timer 808 generates a selector control signal 812 to control a selector 809 at regular intervals. Depending upon the selector control signal 812 from the timer 808, the selector 809 selects ROMs 810, 810a, 810b, . . . , and 810n, and sends circuit data 811 to the variable configuration processing circuit 804 for encryption/decryption. In response to the circuit data 811, the variable configuration processing circuit 804 for encryption/decryption temporarily stops generation of the output data 807, and sends the circuit update posting signal 805 to the encryption/decryption data holding portion 803 to stop output of the held data 806. The internal circuit configuration of the variable configuration processing circuit 804 for encryption/decryption is updated depending upon the circuit data 811. When the update is completed, the variable configuration processing circuit 804 stops the circuit update posting signal 805 so as to resume output of the held data 806 from the encryption/decryption data holding portion 803, thereby taking as input the held data 806. Finally, the variable configuration processing circuit 804 for encryption/decryption performs the encryption/decryption operation of the held data 806 through the updated internal circuit configuration, thereafter sending output data 807. Hence, since no keyword is sent for decryption, unauthorized cryptanalysis becomes more difficult.

The timers in synchronization with each other are mounted on both the transmitting end and the receiving end, resulting in the configuration with higher confidentiality.

FIG. 11 is a block diagram showing an eighth embodiment of an encryption-decryption apparatus of the present invention.

In the drawing, a transmitting apparatus for encryption and a receiving apparatus for decryption are not discretely shown through a network 111, but shown as one block with the term "encryption/decryption" for the sake of simplicity. The term "encryption/decryption" is read as encryption in the case of the transmitting apparatus, or is read as decryption in the case of the receiving apparatus.

Referring to FIG. 11, input data 902 input into an encryption-decryption apparatus 901 is temporarily held in an encryption/decryption data holding portion 903. Unless output is stopped by a circuit update posting signal 905 from a variable configuration processing circuit 904 for encryption/decryption, the encryption/decryption data holding portion 903 continuously sends held data 906 to the variable configuration processing circuit 904 for encryption/decryption. The variable configuration processing circuit 904 for encryption/decryption receives the held data 906 from the encryption/decryption data holding portion 903, and performs an encryption/decryption operation of the held data 906 through an internal circuit configuration, thereafter sending output data 907.

A timer 908 outputs a signal to an FPGA circuit data generating portion 909 at regular intervals. Depending upon the signal information received from the timer 908, the FPGA circuit data generating portion 909 controls a selector 910 to selectively take as inputs circuit data 912 from data circuit portions 911, 911a, 911b, . . . , and 911n. Further, the FPGA circuit data generating portion 909 combines the circuit data 912 into circuit data 913 for the variable configuration processing circuit 904, and sends the generated circuit data 913 to the variable configuration processing circuit 904 for encryption/decryption. In response to the circuit data 913, the variable configuration processing circuit 904 for encryption/decryption temporarily stops generation of the output data 907, and sends the circuit update posting signal 905 to the encryption/decryption data holding portion 903 to stop output of the output data 907. The internal circuit configuration of the variable configuration processing circuit 904 for encryption/decryption is updated depending upon the circuit data 913. When the update is completed, the variable configuration processing circuit 904 resumes output of the held data 906 from the encryption/decryption data holding portion 903. That is, the variable configuration processing circuit 904 stops the circuit update posting signal 905 and takes as input the held data 906. Finally, the variable configuration processing circuit 904 for encryption/decryption performs the encryption/decryption operation of the held data 906 through the updated internal circuit configuration, thereafter sending the output data 907. Hence, since this results in a configuration with higher confidentiality and higher degree of flexibility, unauthorized cryptanalysis becomes more difficult.

Figure 12:
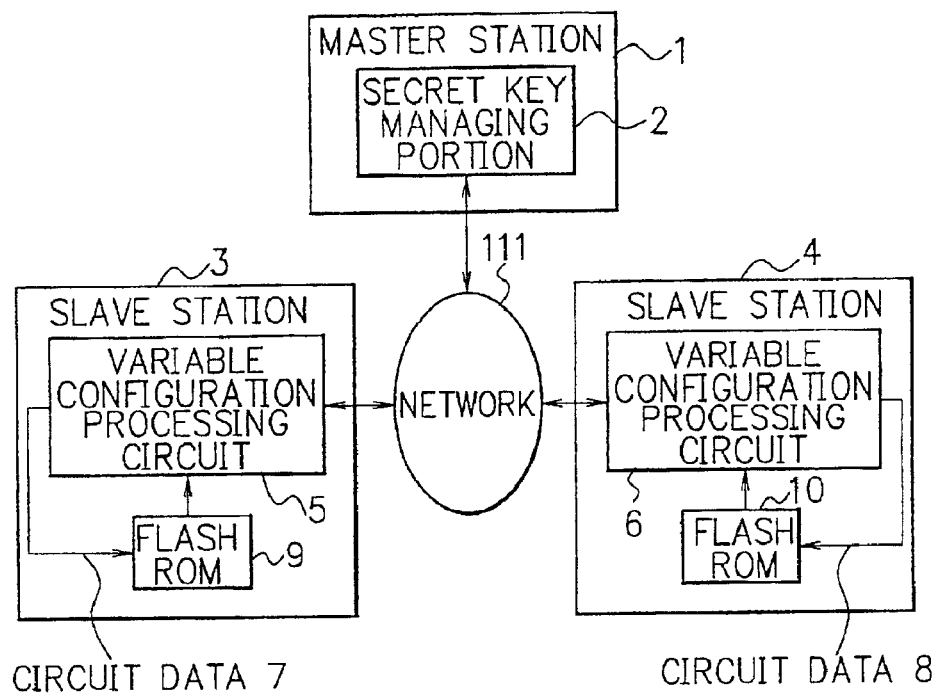
FIG. 12 is a block diagram showing a system using the encryption-decryption apparatus of the present invention.

FIG. 12 is a block diagram showing a system using the encryption-decryption apparatus of the present invention.

Referring to FIG. 12, at regular intervals, a secret key managing portion 2 of a master station 1 sends to slave stations 3, 4 data used to update an FPGA for encryption/decryption. In the slave stations 3, 4, circuit data 7, 8 are recognized by variable configuration processing circuits 5, 6 obtained according to previous circuit data, and the variable configuration processing circuits 5, 6 store the circuit data 7, 8 in FLASH ROMS 9, 10. The master station 1 posts an update instruction to both the slave stations 3, 4. In response to the posted instruction, in the slave stations 3, 4, circuit configurations of the variable configuration processing circuits 5, 6 are concurrently updated depending upon the circuit data 7, 8 stored in the FLASH ROMs 9, 10. As a result, the variable configuration processing circuits 5, 6 for encryption/decryption enable communication by using a new secret key. In a routine communication, the circuit data 7, 8 may be sent little by little, and may be signals to serve as dummy bit so as to gradually update internal configurations of the FLASH ROMs 9, 10.

Figure 13:
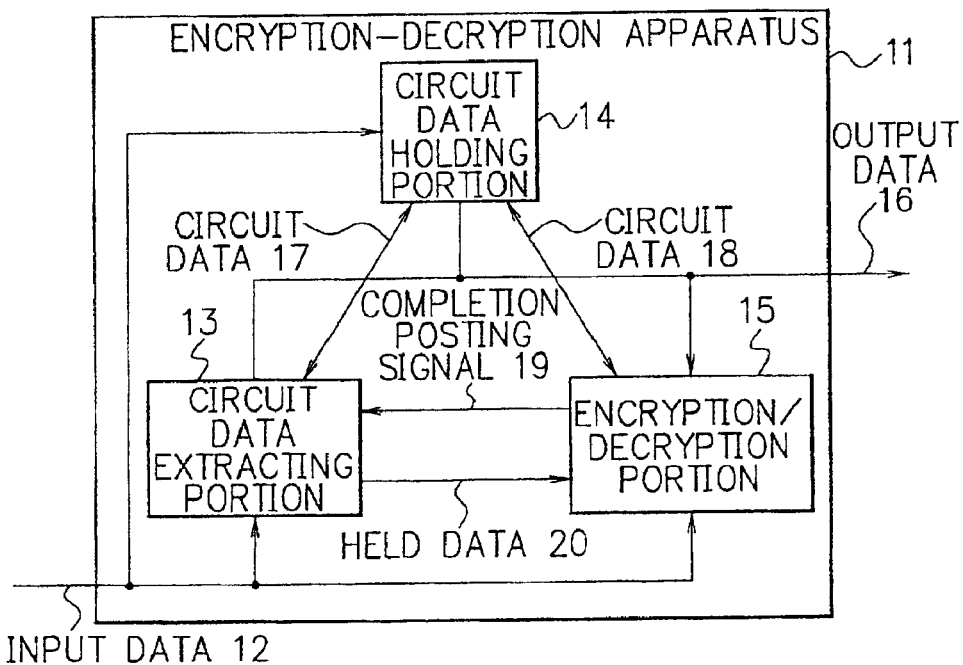
FIG. 13 is a block diagram showing one illustrative encryption-decryption apparatus including variable configuration processing circuits.

FIG. 13 is a block diagram showing one illustrative encryption-decryption apparatus including variable configuration processing circuits.

Referring to FIG. 13, in an encryption-decryption apparatus 11, input data 12 is input into all of a circuit data extracting portion 13, a circuit data holding portion 14, and an encryption/decryption portion 15. The circuit data extracting portion 13 holds the input data 12 to analyze internal information thereof, thereafter extracting circuit data 17. The circuit data holding portion 14 holds and sends the extracted circuit data 17 as circuit data 18 to the encryption/decryption portion 15. An internal circuit configuration of the encryption/decryption portion 15 is updated depending upon the circuit data 18 from the circuit data holding portion 14. When the update is completed, the circuit data extracting portion 13 performs an encryption/decryption operation of the held input data 12 to generate and send output data 16.

Though the FLASH ROMs are employed in the embodiment, it must be noted that the same effect can technically be obtained by using variable configuration processing circuits instead of the FLASH ROMs.

That is, in the apparatus, the variable configuration processing circuits including FPGAs may be used instead of the FLASH ROMs, and the FPGA may be employed as the circuit data extracting portion. It is thereby possible to provide an effect in that unauthorized cryptanalysis can be avoided unless all the circuit configurations of the FPGAs can completely be analyzed. In FIG. 13, the encryption-decryption apparatus 11 includes the three FPGAs, i.e., the circuit data extracting portion 13, the circuit data holding portion 14, and the encryption/decryption portion 15. The input data 12 is input into all of the FPGAs of the circuit data extracting portion 13, the circuit data holding portion 14, and the encryption/decryption portion 15. The circuit data extracting portion 13 extracts the circuit information. The circuit data holding portion 14 holds the extracted circuit data 17. The circuit configuration of the encryption/decryption portion 15 is updated depending upon the circuit data 18 from the circuit data holding portion 14.

When the update is completed, the encryption/decryption portion 15 outputs a completion posting signal 19 to the circuit data extracting portion 13. In response to the completion posting signal 19, the circuit data extracting portion 13 sends held data 20 which has been held therein to the encryption/decryption portion 15. The encryption/decryption portion 15 performs an encryption/decryption operation through a new circuit configuration to send data. This provides various defenses against unauthorized cryptanalysis.

In the embodiment, the respective encryption-decryption apparatus include the circuit data extracting portion. Hence, there is a synergistic effect in that, even if the circuit update of one of the FPGAs is failed or one FPGA is broken down, the circuit configuration can be updated by another FPGA.

In the embodiment, it is to be noted that the FPGA may be replaced with an FPGA-based ASIC (Application Specific Integrated Circuit). If the ASIC can realize a complicated circuit configuration, it is possible to implement data transmission with higher confidentiality.

As set forth above, variable circuit data is used for the variable configuration processing circuit in the encryption-decryption apparatus of the present invention. Consequently, it is possible to provide an effect in that the operation of cryptographic algorithms can be updated without reduction of processing power.

Further, by keeping a secret a conversion algorithm in the circuit data for the variable configuration processing circuit, there are effects in that it is possible to provide a cryptographic system tougher for unauthorized cryptanalysis, and avoid leakage of the decryption program data.

What is claimed is:

1. An encryption-decryption apparatus comprising:
a transmitting apparatus to encrypt input data to output encrypted data;
a network to transmit the encrypted data; and
a receiving apparatus to take as input the encrypted data transmitted through the network, perform a decryption operation, and send output data obtained by the decryption,
wherein the transmitting apparatus includes a variable configuration processing circuit for encryption, and a ROM to output circuit data serving as a secret key to the variable configuration processing circuit, and the receiving apparatus including a variable configuration processing circuit for decryption, and a ROM to output circuit data serving as a secret key to the variable configuration processing circuit, and wherein the variable configuration processing circuit is a Field Programmable Gate Array.

2. The encryption-decryption apparatus according to claim 1, wherein the transmitting apparatus having:
an encryption/decryption data holding portion to take as input and hold the input data, and receive the completion posting signal to output as held data the input data which has been held therein;
a flash ROM in which data of a cryptographic algorithm is stored; and
a variable configuration processing circuit to take as input the input data, output first circuit data to the flash ROM, update data in the flash ROM by the first circuit data, take as input second circuit data from the flash ROM when the update is completed to update an own internal circuit, output the completion posting signal to the encryption/decryption data holding portion after the internal circuit is updated, and send output data obtained by encryption of the held data, and
the receiving apparatus having:
an encryption/decryption data holding portion to take as input and hold the encrypted output data, and receive the completion posting signal to output as held data the output data which has been held therein;
a flash ROM in which data of a cryptographic algorithm is stored; and
a variable configuration processing circuit to take as input the encrypted output data, output first circuit data to the flash ROM, update data in the flash ROM by the first circuit data, take as input second circuit data from the flash ROM after the update is completed to update an own internal circuit, output the completion posting signal to the encryption/decryption data holding portion after the internal circuit is updated, and send output data obtained by decryption of the held data.

3. The encryption-decryption apparatus according to claim 1, wherein the transmitting apparatus having:
a circuit data extracting portion to take as input the input data, and generate and output circuit data;
an encryption/decryption data holding portion to hold the input data until a circuit is completely updated, and receive a completion posting signal to output as held data the input data which has been held therein; and
a variable configuration processing circuit to update the circuit for encryption by using the circuit data, output the completion posting signal to the encryption/decryption data holding portion when the circuit is completely updated, and send output data obtained by encryption through an updated circuit configuration, and the receiving apparatus having:
a circuit data extracting portion to take as input the encrypted output data, and generate and output circuit data;
an encryption/decryption data holding portion to hold the output data until the circuit is completely updated, and receive a completion posting signal to output as held data the encrypted output data which has been held therein; and
a variable configuration processing circuit to update a circuit for decryption by using the circuit data, output the completion posting signal to the encryption/decryption data holding portion after the circuit is completely updated, and send output data obtained by decryption through an updated circuit configuration.

4. An encryption-decryption apparatus according to claim 1, wherein the transmitting apparatus having:
an encryption/decryption data holding portion to take as input and hold the input data, and receive the completion posting signal to output as held data the input data which has been held therein;
a flash ROM in which data of a cryptographic algorithm is stored; and
a variable configuration processing circuit to take as input the input data, output first circuit data to the flash ROM, update data in the flash ROM by the first circuit data, take as input second circuit data from the flash ROM when the update is completed to update an own internal circuit, output the completion posting signal to the encryption/decryption data holding portion after the internal circuit is updated, and send output data obtained by encryption of the held data;
the receiving apparatus having:
an encryption/decryption data holding portion to take as input and hold the encrypted output data, and receive the completion posting signal to output as held data the output data which has been held therein;
a flash ROM in which data of a cryptographic algorithm is stored;
a variable configuration processing circuit to take as input the encrypted output data, output first circuit data to the flash ROM, update data in the flash ROM by the first circuit data, take as input second circuit data from the flash ROM after the update is completed to update an own internal circuit, output the completion posting signal to the encryption/decryption data holding portion after the internal circuit is updated, and send output data obtained by decryption of the held data; and
the variable configuration processing circuit is a Field Programmable Gate Array.

5. The encryption-decryption apparatus according to claim 1, wherein the transmitting apparatus having:
a circuit data extracting portion to take as input the input data, and generate and output circuit data;
an encryption/decryption data holding portion to hold the input data until a circuit is completely updated, and receive a completion posting signal to output as held data the input data which has been held therein; and
a variable configuration processing circuit to update the circuit for encryption by using the circuit data, output the completion posting signal to the encryption/decryption data holding portion when the circuit is completely updated, and send output data obtained by encryption through an updated circuit configuration, and the receiving apparatus having:
a circuit data extracting portion to take as input the encrypted output data, and generate and output circuit data;
an encryption/decryption data holding portion to hold the output data until the circuit is completely updated, and receive a completion posting signal to output as held data the encrypted output data which has been held therein;
a variable configuration processing circuit to update a circuit for decryption by using the circuit data, output the completion posting signal to the encryption/decryption data holding portion after the circuit is completely updated, and send output data obtained by decryption through an updated circuit configuration; and
the variable configuration processing circuit is a Field Programmable Gate Array.

6. An encryption-decryption apparatus comprising:
a transmitting apparatus to encrypt input data to output encrypted data;
a network to transmit the encrypted data; and
a receiving apparatus to take as input the encrypted data transmitted through the network, perform a decryption operation, and send output data obtained by the decryption,
wherein the transmitting apparatus having:
a data analyzing portion to analyze information of the input data according to a predetermined instruction, and output updating information after decoding;
a plurality of ROMs in which circuit data used for specification of a cryptographic algorithm is stored;
a selector to select the plurality of ROMs according to an instruction in the updating information, and cause the selected ROM to send circuit data for encryption;
a variable configuration processing circuit to update an own internal circuit depending upon the circuit data used for specification of the cryptographic algorithm according to selection of the ROM, output a completion posting signal when the update of the internal circuit is completed, and send to the network encrypted data obtained by encryption of held input data; and
an encryption/decryption data holding portion to receive the completion posting signal, and output as the held input data the input data which has been held therein to the variable configuration processing circuit for encryption, and
the receiving apparatus having:
a data analyzing portion to analyze according to a predetermined instruction information of the encrypted data input from the network, and output updating information after decoding;
a plurality of ROMs in which circuit data used for specification of a cryptographic algorithm is stored;
a selector to select the plurality of ROMs according to an instruction in the updating information, and cause the selected ROM to send circuit data for decryption;
a variable configuration processing circuit to update an own internal circuit for decryption depending upon the circuit data used for specification of the cryptographic algorithm according to selection of the ROM, output a completion posting signal when the update of the internal circuit is completed, and send decrypted output data obtained by decryption of encrypted data of the held input data; and an encryption/decryption data holding portion to receive the completion posting signal, and output as the held input data the encrypted data which has been held therein to the variable configuration processing circuit for decryption.

7. The encryption-decryption apparatus according to claim 6, wherein the transmitting apparatus having:

an encryption/decryption data holding portion to take as input and hold the input data, and receive the completion posting signal to output as held data the input data which has been held therein;

a flash ROM in which data of a cryptographic algorithm is stored; and a variable configuration processing circuit to take as input the input data, output first circuit data to the flash ROM, update data in the flash ROM by the first circuit data, take as input second circuit data from the flash ROM when the update is completed to update an own internal circuit, output the completion posting signal to the encryption/decryption data holding portion after the internal circuit is updated, and send output data obtained by encryption of the held data, and the receiving apparatus having:

an encryption/decryption data holding portion to take as input and hold the encrypted output data, and receive the completion posting signal to output as held data the output data which has been held therein;

a flash ROM in which data of a cryptographic algorithm is stored; and a variable configuration processing circuit to take as input the encrypted output data, output first circuit data to the flash ROM, update data in the flash ROM by the first circuit data, take as input second circuit data from the flash ROM after the update is completed to update an own internal circuit, output the completion posting signal to the encryption/decryption data holding portion after the internal circuit is updated, and send output data obtained by decryption of the held data.

8. The encryption-decryption apparatus according to claim 6, wherein the transmitting apparatus having:

a circuit data extracting portion to take as input the input data, and generate and output circuit data;

an encryption/decryption data holding portion to hold the input data until a circuit is completely updated, and receive a completion posting signal to output as held data the input data which has been held therein; and a variable configuration processing circuit to update the circuit for encryption by using the circuit data, output the completion posting signal to the encryption/decryption data holding portion when the circuit is completely updated, and send output data obtained by encryption through an updated circuit configuration, and the receiving apparatus having:

a circuit data extracting portion to take as input the encrypted output data, and generate and output circuit data;

an encryption/decryption data holding portion to hold the output data until the circuit is completely updated, and receive a completion posting signal to output as held data the encrypted output data which has been held therein; and a variable configuration processing circuit to update a circuit for decryption by using the circuit data, output the completion posting signal to the encryption/decryption data holding portion after the circuit is completely updated, and send output data obtained by decryption through an updated circuit configuration.

9. The encryption-decryption apparatus according to claim 6, wherein the variable configuration processing circuit is a Field Programmable Gate Array.

10. The encryption-decryption apparatus according to claim 6, wherein the transmitting apparatus having:

an encryption/decryption data holding portion to take as input and hold the input data, and receive the completion posting signal to output as held data the input data which has been held therein;

a flash ROM in which data of a cryptographic algorithm is stored; and a variable configuration processing circuit to take as input the input data, output first circuit data to the flash ROM, update data in the flash ROM by the first circuit data, take as input second circuit data from the flash ROM when the update is completed to update an own internal circuit, output the completion posting signal to the encryption/decryption data holding portion after the internal circuit is updated, and send output data obtained by encryption of the held data, and the receiving apparatus having:

an encryption/decryption data holding portion to take as input and hold the encrypted output data, and receive the completion posting signal to output as held data the output data which has been held therein;

a flash ROM in which data of a cryptographic algorithm is stored;

a variable configuration processing circuit to take as input the encrypted output data, output first circuit data to the flash ROM, update data in the flash ROM by the first circuit data, take as input second circuit data from the flash ROM after the update is completed to update an own internal circuit, output the completion posting signal to the encryption/decryption data holding portion after the internal circuit is updated, and send output data obtained by decryption of the held data; and the variable configuration processing circuit is a Field Programmable Gate Array.

11. The encryption-decryption apparatus according to claim 6, wherein the transmitting apparatus having:

a circuit data extracting portion to take as input the input data, and generate and output circuit data;

an encryption/decryption data holding portion to hold the input data until a circuit is completely updated, and receive a completion posting signal to output as held data the input data which has been held therein; and a variable configuration processing circuit to update the circuit for encryption by using the circuit data, output the completion posting signal to the encryption/decryption data holding portion when the circuit is completely updated, and send output data obtained by encryption through an updated circuit configuration, and the receiving apparatus having:

a circuit data extracting portion to take as input the encrypted output data, and generate and output circuit data;

an encryption/decryption data holding portion to hold the output data until the circuit is completely updated, and receive a completion posting signal to output as held data the encrypted output data which has been held therein;

a variable configuration processing circuit to update a circuit for decryption by using the circuit data, output the completion posting signal to the encryption/decryption data holding portion after the circuit is completely updated, and send output data obtained by decryption through an updated circuit configuration; and the variable configuration processing circuit is a Field Programmable Gate Array.

12. An encryption-decryption apparatus comprising:

a transmitting apparatus to encrypt input data to output encrypted data;

a network to transmit the encrypted data; and a receiving apparatus to take as input the encrypted data transmitted through the network, perform a decryption operation, and send output data obtained by the decryption, wherein the transmitting apparatus having:

a data analyzing portion to analyze information of the input data according to a predetermined instruction, and output analysis information;

a plurality of data circuit portions to hold circuit data used for specification of a cryptographic algorithm;

a Field Programmable Gate Array (FPGA) circuit data generating portion to output a selection signal depending upon the analysis data from the data analyzing portion, take as input first circuit data for update of a circuit configuration, and generate and output second circuit data;

a selector to select the plurality of circuit data according to an instruction of the selection signal, and output the first circuit data for encryption to the FPGA circuit data generating portion depending upon the selected circuit data;

a variable configuration processing circuit to update an own internal circuit depending upon the second circuit data output from the FPGA circuit data generating portion, output a completion posting signal when the update of the internal circuit is completed, and send to the network encrypted data obtained by encryption of held input data;

an encryption/decryption data holding portion to receive the completion posting signal, and additionally output as the held input data the input data which has been held therein to the variable configuration processing circuit, and the receiving apparatus having:

a data analyzing portion to analyze according to a predetermined instruction information of the encrypted data input from the network, and output analysis data;

a plurality of FPGA circuit data generating portions to output a selection signal depending upon the analysis data from the data analyzing portion, take as input first circuit data for update of a circuit configuration, and generate and output second circuit data;

a plurality of data circuit portions to hold circuit data used for specification of a cryptographic algorithm;

a selector to select the plurality of circuit data according to an instruction in the selection signal, and output to the FPGA circuit data generating portion the first circuit data used for decryption depending upon the selected circuit data;

a variable configuration processing circuit to update an own internal circuit for decryption depending upon the second circuit data output from the FPGA circuit data generating portion, output a completion posting signal when the update of the internal circuit is completed, and send decrypted output data obtained by decryption of encrypted data of held input data; and an encryption/decryption data holding portion to receive the completion posting signal, and additionally output as the held input data the input data which has been held therein to the variable configuration processing circuit.

13. The encryption-decryption apparatus according to claim 12, wherein the transmitting apparatus having:

an encryption/decryption data holding portion to take as input and hold the input data, and receive the completion posting signal to output as held data the input data which has been held therein;

a flash ROM in which data of a cryptographic algorithm is stored; and a variable configuration processing circuit to take as input the input data, output first circuit data to the flash ROM, update data in the flash ROM by the first circuit data, take as input second circuit data from the flash ROM when the update is completed to update an own internal circuit, output the completion posting signal to the encryption/decryption data holding portion after the internal circuit is updated, and send output data obtained by encryption of the held data, and the receiving apparatus having:

an encryption/decryption data holding portion to take as input and hold the encrypted output data, and receive the completion posting signal to output as held data the output data which has been held therein;

a flash ROM in which data of a cryptographic algorithm is stored; and a variable configuration processing circuit to take as input the encrypted output data, output first circuit data to the flash ROM, update data in the flash ROM by the first circuit data, take as input second circuit data from the flash ROM after the update is completed to update an own internal circuit, output the completion posting signal to the encryption/decryption data holding portion after the internal circuit is updated, and send output data obtained by decryption of the held data.

14. The encryption-decryption apparatus according to claim 12, wherein the transmitting apparatus having:

a circuit data extracting portion to take as input the input data, and generate and output circuit data;

an encryption/decryption data holding portion to hold the input data until a circuit is completely updated, and receive a completion posting signal to output as held data the input data which has been held therein; and a variable configuration processing circuit to update the circuit for encryption by using the circuit data, output the completion posting signal to the encryption/decryption data holding portion when the circuit is completely updated, and send output data obtained by encryption through an updated circuit configuration, and the receiving apparatus having:

a circuit data extracting portion to take as input the encrypted output data, and generate and output circuit data;

an encryption/decryption data holding portion to hold the output data until the circuit is completely updated, and receive a completion posting signal to output as held data the encrypted output data which has been held therein; and a variable configuration processing circuit to update a
  circuit for decryption by using the circuit data, output
  the completion posting signal to the encryption/
  decryption data holding portion after the circuit is
  completely updated, and send output data obtained by
  decryption through an updated circuit configuration.

15. The encryption-decryption apparatus according to claim 12, wherein the variable configuration processing circuit is a Field Programmable Gate Array.

16. An encryption-decryption apparatus according to claim 12, wherein the transmitting apparatus having:

an encryption/decryption data holding portion to take as
  input and hold the input data, and receive the completion
  posting signal to output as held data the input data
  which has been held therein;

a flash ROM in which data of a cryptographic algorithm
  is stored; and a variable configuration processing circuit to take as input
  the input data, output first circuit data to the flash ROM,
  update data in the flash ROM by the first circuit data,
  take as input second circuit data from the flash ROM
  when the update is completed to update an own internal
  circuit, output the completion posting signal to the
  encryption/decryption data holding portion after the
  internal circuit is updated, and send output data
  obtained by encryption of the held data, and the receiving apparatus having:

an encryption/decryption data holding portion to take as
  input and hold the encrypted output data, and receive
  the completion posting signal to output as held data the
  output data which has been held therein;

a flash ROM in which data of a cryptographic algorithm
  is stored;

a variable configuration processing circuit to take as input
  the encrypted output data, output first circuit data to the
  flash ROM, update data in the flash ROM by the first
  circuit data, take as input second circuit data from the
  flash ROM after the update is completed to update an
  own internal circuit, output the completion posting
  signal to the encryption/decryption data holding portion
  after the internal circuit is updated, and send output
  data obtained by decryption of the held data; and the variable configuration processing circuit is a Field
  Programmable Gate Array.

17. The encryption-decryption apparatus according to claim 12, wherein the transmitting apparatus having:

a circuit data extracting portion to take as input the input
  data, and generate and output circuit data;

an encryption/decryption data holding portion to hold the
  input data until a circuit is completely updated, and
  receive a completion posting signal to output as held
  data the input data which has been held therein; and a variable configuration processing circuit to update the
  circuit for encryption by using the circuit data, output
  the completion posting signal to the encryption/
  decryption data holding portion when the circuit is
  completely updated, and send output data obtained by
  encryption through an updated circuit configuration,
  and the receiving apparatus having:

a circuit data extracting portion to take as input the
  encrypted output data, and generate and output circuit
  data;

an encryption/decryption data holding portion to hold the
  output data until the circuit is completely updated, and
  receive a completion posting signal to output as held
  data the encrypted output data which has been held
  therein;

a variable configuration processing circuit to update a
  circuit for decryption by using the circuit data, output
  the completion posting signal to the encryption/
  decryption data holding portion after the circuit is
  completely updated, and send output data obtained by
  decryption through an updated circuit configuration;
  and the variable configuration processing circuit is a Field
  Programmable Gate Array.

18. An encryption-decryption apparatus comprising:

a transmitting apparatus to encrypt input data to output
  encrypted data;

a network to transmit the encrypted data; and a receiving apparatus to take as input the encrypted data
  transmitted through the network, perform a decryption
  operation, and send output data obtained by the
  decryption, wherein the transmitting apparatus includes a variable
  configuration processing circuit for encryption, and a
  ROM to output circuit data serving as a secret key to
  the variable configuration processing circuit, and the
  receiving apparatus including a variable configuration
  processing circuit for decryption, and a ROM to output
  circuit data serving as a secret key to the variable
  configuration processing circuit;

the transmitting apparatus having:

an encryption/decryption data holding portion to take as
  input and hold the input data, and take as input a circuit
  update posting signal to output as held data the input
  data which has been held therein;

a random generator to generate an encryption code;

a data analyzing portion to make a decision as to whether
  the input data is data to be encrypted or data to be
  decrypted, and output analysis data used to instruct to
  enable data from the random generator in the case of
  data to be encrypted or instruct to enable a secret key
  in the case of data to be decrypted;

an FPGA circuit data generating portion to generate and
  output first circuit data according to the posted analysis
  data;

a plurality of ROMs in which data used for specification
  of a cryptographic algorithm is stored;

a selector to take circuit data from the plurality of ROMs
  depending upon the first circuit data, and output second
  circuit data used for specification of a cryptographic
  algorithm; and a variable configuration processing circuit to take as input
  the second circuit data to output the circuit update
  posting signal so as to stop output of the held data from
  the encryption/decryption data holding portion, update
  an own internal circuit for encryption by the second
  circuit data, stop the circuit update posting signal when
  the update is completed, and resume output of the held
  data to output the encrypted output data, and the receiving apparatus having:

an encryption/decryption data holding portion to take as
  input and hold the encrypted output data, and take as
  input a circuit update posting signal to output as held
  data the output data which has been held therein;

a random generator to generate an encryption code;

a data analyzing portion to make a decision as to whether
  the encrypted output data is data to be encrypted or data to be decrypted, and output analysis data to instruct to enable data from the random generator in the case of data to be encrypted or instruct to enable a secret key in the case of data to be decrypted;

an FPGA circuit data generating portion to generate and output first circuit data according to the posted analysis data;

a plurality of ROMs in which data used for specification of a cryptographic algorithm is stored;

a selector to take circuit data from the plurality of ROMs depending upon the first circuit data, and output second circuit data used for specification of a cryptographic algorithm; and a variable configuration processing circuit to take as input the second circuit data to output the circuit update posting signal so as to stop output of the held data from the encryption/decryption data holding portion, update an own internal circuit for decryption by the second circuit data, stop the circuit update posting signal when the update is completed, and resume output of the held data to output the decrypted output data.

19. The encryption-decryption apparatus according to claim 18, wherein the plurality of ROMs data are data from a plurality of data circuits implemented via hardware, the selector outputting circuit data as first circuit data to the FPGA circuit data generating portion, and the FPGA circuit data generating portion outputting second circuit data to the variable configuration processing circuit.

20. The encryption-decryption apparatus according to claim 18, wherein the plurality of ROMs data are data from a plurality of data circuit portions implemented via hardware, the random generator being a timer to generate and output a selector control signal at regular intervals, the selector outputting circuit data as first circuit data to the FPGA circuit data generating portion, and the FPGA circuit data generating portion outputting second circuit data to the variable configuration processing circuit.

21. The encryption-decryption apparatus according to claim 18, wherein the variable configuration processing circuit is a Field Programmable Gate Array.

22. An encryption-decryption apparatus comprising:

a transmitting apparatus to encrypt input data to output encrypted data;

a network to transmit the encrypted data; and a receiving apparatus to take as input the encrypted data transmitted through the network, perform a decryption operation, and send output data obtained by the decryption, wherein the transmitting apparatus having:

a data analyzing portion to analyze information of the input data according to a predetermined instruction, and output updating information after decoding;

a plurality of ROMs in which circuit data used for specification of a cryptographic algorithm is stored;

a selector to select the plurality of ROMs according to an instruction in the updating information, and cause the selected ROM to send circuit data for encryption;

a variable configuration processing circuit to update an own internal circuit depending upon the circuit data used for specification of the cryptographic algorithm according to selection of the ROM, output a completion posting signal when the update of the internal circuit is completed, and send to the network encrypted data obtained by encryption of held input data; and an encryption/decryption data holding portion to receive the completion posting signal, and output as the held input data the input data which has been held therein to the variable configuration processing circuit for encryption;

the receiving apparatus having:

a data analyzing portion to analyze according to a predetermined instruction information of the encrypted data input from the network, and output updating information after decoding;

a plurality of ROMs in which circuit data used for specification of a cryptographic algorithm is stored;

a selector to select the plurality of ROMs according to an instruction in the updating information, and cause the selected ROM to send circuit data for decryption;

a variable configuration processing circuit to update an own internal circuit for decryption depending upon the circuit data used for specification of the cryptographic algorithm according to selection of the ROM, output a completion posting signal when the update of the internal circuit is completed, and send decrypted output data obtained by decryption of encrypted data of the held input data; and an encryption/decryption data holding portion to receive the completion posting signal, and output as the held input data the encrypted data which has been held therein to the variable configuration processing circuit for decryption the transmitting apparatus having:

an encryption/decryption data holding portion to take as input and hold the input data, and take as input a circuit update posting signal to output as held data the input data which has been held therein;

a random generator to generate an encryption code;

a data analyzing portion to make a decision as to whether the input data is data to be encrypted or data to be decrypted, and output analysis data used to instruct to enable data from the random generator in the case of data to be encrypted or instruct to enable a secret key in the case of data to be decrypted;

an FPGA circuit data generating portion to generate and output first circuit data according to the posted analysis data;

a plurality of ROMs in which data used for specification of a cryptographic algorithm is stored;

a selector to take circuit data from the plurality of ROMs depending upon the first circuit data, and output second circuit data used for specification of a cryptographic algorithm; and a variable configuration processing circuit to take as input the second circuit data to output the circuit update posting signal so as to stop output of the held data from the encryption/decryption data holding portion, update an own internal circuit for encryption by the second circuit data, stop the circuit update posting signal when the update is completed, and resume output of the held data to output the encrypted output data, and the receiving apparatus having:

an encryption/decryption data holding portion to take as input and hold the encrypted output data, and take as input a circuit update posting signal to output as held data the output data which has been held therein;

a random generator to generate an encryption code;

a data analyzing portion to make a decision as to whether the encrypted output data is data to be encrypted or data to be decrypted, and output analysis data to instruct to enable data from the random generator in the case of data to be encrypted or instruct to enable a secret key in the case of data to be decrypted;

an FPGA circuit data generating portion to generate and output first circuit data according to the posted analysis data;

a plurality of ROMs in which data used for specification of a cryptographic algorithm is stored;

a selector to take circuit data from the plurality of ROMs depending upon the first circuit data, and output second circuit data used for specification of a cryptographic algorithm; and a variable configuration processing circuit to take as input the second circuit data to output the circuit update posting signal so as to stop output of the held data from the encryption/decryption data holding portion, update an own internal circuit for decryption by the second circuit data, stop the circuit update posting signal when the update is completed, and resume output of the held data to output the decrypted output data.

23. The encryption-decryption apparatus according to claim 22, wherein the plurality of ROMs data are data from a plurality of data circuits implemented via hardware, the selector outputting circuit data as first circuit data to the FPGA circuit data generating portion, and the FPGA circuit data generating portion outputting second circuit data to the variable configuration processing circuit.

24. An encryption-decryption apparatus according to claim 22, wherein the plurality of ROMs data are data from a plurality of data circuit portions implemented via hardware, the random generator being a timer to generate and output a selector control signal at regular intervals, the selector outputting circuit data as first circuit data to the FPGA circuit data generating portion, and the FPGA circuit data generating portion outputting second circuit data to the variable configuration processing circuit.

25. The encryption-decryption apparatus according to claim 22, wherein the variable configuration processing circuit is a Field Programmable Gate Array.

26. An encryption-decryption apparatus comprising:

a transmitting apparatus to encrypt input data to output encrypted data;

a network to transmit the encrypted data; and a receiving apparatus to take as input the encrypted data transmitted through the network, perform a decryption operation, and send output data obtained by the decryption, the transmitting apparatus having:

a data analyzing portion to analyze information of the input data according to a predetermined instruction, and output analysis information;

a plurality of data circuit portions to hold circuit data used for specification of a cryptographic algorithm;

a Field Programmable Gate Array (hereinafter abbreviated to as FPGA) circuit data generating portion to output a selection signal depending upon the analysis data from the data analyzing portion, take as input first circuit data for update of a circuit configuration, and generate and output second circuit data;

a selector to select the plurality of circuit data according to an instruction of the selection signal, and output the first circuit data for encryption to the FPGA circuit data generating portion depending upon the selected circuit data;

a variable configuration processing circuit to update an own internal circuit depending upon the second circuit data output from the FPGA circuit data generating portion, output a completion posting signal when the update of the internal circuit is completed, and send to the network encrypted data obtained by encryption of held input data; and an encryption/decryption data holding portion to receive the completion posting signal, and additionally output as the held input data the input data which has been held therein to the variable configuration processing circuit;

the receiving apparatus having:

a data analyzing portion to analyze according to a predetermined instruction information of the encrypted data input from the network, and output analysis data;

a plurality of FPGA circuit data generating portions to output a selection signal depending upon the analysis data from the data analyzing portion, take as input first circuit data for update of a circuit configuration, and generate and output second circuit data;

a plurality of data circuit portions to hold circuit data used for specification of a cryptographic algorithm;

a selector to select the plurality of circuit data according to an instruction in the selection signal, and output to the FPGA circuit data generating portion the first circuit data used for decryption depending upon the selected circuit data;

a variable configuration processing circuit to update an own internal circuit for decryption depending upon the second circuit data output from the FPGA circuit data generating portion, output a completion posting signal when the update of the internal circuit is completed, and send decrypted output data obtained by decryption of encrypted data of held input data; and an encryption/decryption data holding portion to receive the completion posting signal, and additionally output as the held input data the input data which has been held therein to the variable configuration processing circuit;

the transmitting apparatus further comprising:

an encryption/decryption data holding portion to take as input and hold the input data, and take as input a circuit update posting signal to output as held data the input data which has been held therein;

a random generator to generate an encryption code;

a data analyzing portion to make a decision as to whether the input data is data to be encrypted or data to be decrypted, and output analysis data used to instruct to enable data from the random generator in the case of data to be encrypted or instruct to enable a secret key in the case of data to be decrypted;

an FPGA circuit data generating portion to generate and output first circuit data according to the posted analysis data;

a plurality of ROMs in which data used for specification of a cryptographic algorithm is stored;

a selector to take circuit data from the plurality of ROMs depending upon the first circuit data, and output second circuit data used for specification of a cryptographic algorithm; and a variable configuration processing circuit to take as input the second circuit data to output the circuit update posting signal so as to stop output of the held data from the encryption/decryption data holding portion, update an own internal circuit for encryption by the second circuit data, stop the circuit update posting signal when the update is completed, and resume output of the held data to output the encrypted output data, and the receiving apparatus having:

an encryption/decryption data holding portion to take as input and hold the encrypted output data, and take as input a circuit update posting signal to output as held data the output data which has been held therein;

a random generator to generate an encryption code;

a data analyzing portion to make a decision as to whether the encrypted output data is data to be encrypted or data to be decrypted, and output analysis data to instruct to enable data from the random generator in the case of data to be encrypted or instruct to enable a secret key in the case of data to be decrypted;

an FPGA circuit data generating portion to generate and output first circuit data according to the posted analysis data;

a plurality of ROMs in which data used for specification of a cryptographic algorithm is stored;

a selector to take circuit data from the plurality of ROMs depending upon the first circuit data, and output second circuit data used for specification of a cryptographic algorithm; and a variable configuration processing circuit to take as input the second circuit data to output the circuit update posting signal so as to stop output of the held data from the encryption/decryption data holding portion, update an own internal circuit for decryption by the second circuit data, stop the circuit update posting signal when the update is completed, and resume output of the held data to output the decrypted output data.

27. An encryption-decryption apparatus according to claim 26, wherein the plurality of ROMs data are data from a plurality of data circuits implemented via hardware, the selector outputting circuit data as first circuit data to the FPGA circuit data generating portion, and the FPGA circuit data generating portion outputting second circuit data to the variable configuration processing circuit.

28. The encryption-decryption apparatus according to claim 26, wherein the plurality of ROMs data are data from a plurality of data circuit portions implemented via hardware, the random generator being a timer to generate and output a selector control signal at regular intervals, the selector outputting circuit data as first circuit data to the FPGA circuit data generating portion, and the FPGA circuit data generating portion outputting second circuit data to the variable configuration processing circuit.

29. An encryption-decryption apparatus according to claim 26, wherein the variable configuration processing circuit is a Field Programmable Gate Array.

30. An encryption-decryption apparatus comprising:

a transmitting apparatus to encrypt input data to output encrypted data;

a network to transmit the encrypted data; and a receiving apparatus to take as input the encrypted data transmitted through the network, perform a decryption operation, and send output data obtained by the decryption, wherein the transmitting apparatus includes a variable configuration processing circuit for encryption, and a read-only memory (ROM) to output circuit data serving as a secret key to the variable configuration processing circuit, and the receiving apparatus including a variable configuration processing circuit for decryption, and a read-only memory (ROM) to output circuit data serving as a secret key to the variable configuration processing circuit;

the transmitting apparatus having:

an encryption/decryption data holding portion to take as input and hold the input data, and take as input a circuit update posting signal to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to receive the circuit data to output the circuit update posting signal, stop output of the held data, update an own internal circuit configuration depending upon the circuit data, stop the circuit update posting signal when the update is completed so as to resume output of the held data from the encryption/decryption data holding portion, and take as input the held data to perform an encryption operation through an updated internal circuit configuration so as to send encrypted output data, and the receiving apparatus having:

an encryption/decryption data holding portion to take as input and hold the encrypted output data, and take as input a circuit update posting signal so as to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to output the circuit update posting signal in response to the circuit data so as to stop output of the held data, update an own internal circuit configuration depending upon the circuit data, stop the circuit update posting signal when the update is completed so as to resume output of the held data from the encryption/decryption data holding portion, and take as input the held data to perform a decryption operation through an updated internal circuit configuration so as to send decrypted output data.

31. The encryption-decryption apparatus according to claim 30, wherein the variable configuration processing circuit is a Field Programmable Gate Array.

32. An encryption-decryption apparatus comprising:

a transmitting apparatus to encrypt input data to output encrypted data;

a network to transmit the encrypted data; and a receiving apparatus to take as input the encrypted data transmitted through the network, perform a decryption operation, and send output data obtained by the decryption, wherein the transmitting apparatus having:

a data analyzing portion to analyze information of the input data according to a predetermined instruction, and output updating information after decoding;

a plurality of ROMs in which circuit data used for specification of a cryptographic algorithm is stored;

a selector to select the plurality of ROMs according to an instruction in the updating information, and cause the selected ROM to send circuit data for encryption;

a variable configuration processing circuit to update an own internal circuit depending upon the circuit data used for specification of the cryptographic algorithm according to selection of the ROM, output a completion posting signal when the update of the internal circuit is completed, and send to the network encrypted data obtained by encryption of held input data; and an encryption/decryption data holding portion to receive the completion posting signal, and output as the held input data the input data which has been held therein to the variable configuration processing circuit for encryption, and the receiving apparatus having:

a data analyzing portion to analyze according to a predetermined instruction information of the encrypted data input from the network, and output updating information after decoding;

a plurality of ROMs in which circuit data used for specification of a cryptographic algorithm is stored;

a selector to select the plurality of ROMs according to an instruction in the updating information, and cause the selected ROM to send circuit data for decryption;

a variable configuration processing circuit to update an own internal circuit for decryption depending upon the circuit data used for specification of the cryptographic algorithm according to selection of the ROM, output a completion posting signal when the update of the internal circuit is completed, and send decrypted output data obtained by decryption of encrypted data of the held input data; and an encryption/decryption data holding portion to receive the completion posting signal, and output as the held input data the encrypted data which has been held therein to the variable configuration processing circuit for decryption;

the transmitting apparatus having:

an encryption/decryption data holding portion to take as input and hold the input data, and take as input a circuit update posting signal to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to receive the circuit data to output the circuit update posting signal, stop output of the held data, update an own internal circuit configuration depending upon the circuit data, stop the circuit update posting signal when the update is completed so as to resume output of the held data from the encryption/decryption data holding portion, and take as input the held data to perform an encryption operation through an updated internal circuit configuration so as to send encrypted output data, and the receiving apparatus having:

an encryption/decryption data holding portion to take as input and hold the encrypted output data, and take as input a circuit update posting signal so as to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to output the circuit update posting signal in response to the circuit data so as to stop output of the held data, update an own internal circuit configuration depending upon the circuit data, stop the circuit update posting signal when the update is completed so as to resume output of the held data from the encryption/decryption data holding portion, and take as input the held data to perform a decryption operation through an updated internal circuit configuration so as to send decrypted output data.

33. The encryption-decryption apparatus according to claim 32, wherein the variable configuration processing circuit is a Field Programmable Gate Array.

34. An encryption-decryption apparatus comprising:

a transmitting apparatus to encrypt input data to output encrypted data;

a network to transmit the encrypted data; and a receiving apparatus to take as input the encrypted data transmitted through the network, perform a decryption operation, and send output data obtained by the decryption, wherein the transmitting apparatus having:

a data analyzing portion to analyze information of the input data according to a predetermined instruction, and output analysis information;

a plurality of data circuit portions to hold circuit data used for specification of a cryptographic algorithm;

a Field Programmable Gate Array (FPGA) circuit data generating portion to output a selection signal depending upon the analysis data from the data analyzing portion, take as input first circuit data for update of a circuit configuration, and generate and output second circuit data;

a selector to select the plurality of circuit data according to an instruction of the selection signal, and output the first circuit data for encryption to the FPGA circuit data generating portion depending upon the selected circuit data;

a variable configuration processing circuit to update an own internal circuit depending upon the second circuit data output from the FPGA circuit data generating portion, output a completion posting signal when the update of the internal circuit is completed, and send to the network encrypted data obtained by encryption of held input data; and an encryption/decryption data holding portion to receive the completion posting signal, and additionally output as the held input data the input data which has been held therein to the variable configuration processing circuit, and the receiving apparatus having:

a data analyzing portion to analyze according to a predetermined instruction information of the encrypted data input from the network, and output analysis data;

a plurality of FPGA circuit data generating portions to output a selection signal depending upon the analysis data from the data analyzing portion, take as input first circuit data for update of a circuit configuration, and generate and output second circuit data;

a plurality of data circuit portions to hold circuit data used for specification of a cryptographic algorithm;

a selector to select the plurality of circuit data according to an instruction in the selection signal, and output to the FPGA circuit data generating portion the first circuit data used for decryption depending upon the selected circuit data;

a variable configuration processing circuit to update an own internal circuit for decryption depending upon the second circuit data output from the FPGA circuit data generating portion, output a completion posting signal when the update of the internal circuit is completed, and send decrypted output data obtained by decryption of encrypted data of held input data;

an encryption/decryption data holding portion to receive the completion posting signal, and additionally output as the held input data the input data which has been held therein to the variable configuration processing circuit;

the transmitting apparatus further comprising:

an encryption/decryption data holding portion to take as input and hold the input data, and take as input a circuit update posting signal to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to receive the circuit data to output the circuit update posting signal, stop output of the held data, update an own internal circuit configuration depending upon the circuit data, stop the circuit update posting signal when the update is completed so as to resume output of the held data from the encryption/decryption data holding portion, and take as input the held data to perform an encryption operation through an updated internal circuit configuration so as to send encrypted output data, and the receiving apparatus having:

an encryption/decryption data holding portion to take as input and hold the encrypted output data, and take as input a circuit update posting signal so as to output as held data the input data which has been held therein;

a timer to generate and output a selector control signal at regular intervals;

a plurality of ROMs in which circuit data used for specification of a cryptographic algorithm is stored;

a selector to select the plurality of ROMs depending upon the selector control signal to take circuit data for encryption, and output circuit data used for specification of a cryptographic algorithm; and a variable configuration processing circuit to output the circuit update posting signal in response to the circuit data so as to stop output of the held data, update an own internal circuit configuration depending upon the circuit data, stop the circuit update posting signal when the update is completed so as to resume output of the held data from the encryption/decryption data holding portion, and take as input the held data to perform a decryption operation through an updated internal circuit configuration so as to send decrypted output data.

35. An encryption-decryption apparatus according to claim 34, wherein the variable configuration processing circuit is a Field Programmable Gate Array.

36. An encryption-decryption apparatus comprising:

a transmitter and a receiver arranged so as to be able to communicate with one another across a network;

an encryptor in the transmitter constructed so as to perform hardware encryption on input data to generate encrypted data can be sent across the network to the receiver; and a decryptor in the receiver constructed so as to perform hardware decryption on the encrypted data to generate output data;

wherein each of the encryptor and the decryptor is constructed so that the hardware encryption and decryption, respectively, can be selectively reconfigured using circuit data serving as a secret key; and the encryptor is a field programmable gate array; wherein the encryptor is constructed such that once the encryptor is configured using the circuit data serving as the secret key, the encryptor can perform the hardware encryption as configured without further input of the circuit data until the secret key is replaced with a different secret key.

37. The encryption-decryption apparatus of claim 36, wherein the transmitter further comprises a ROM containing the circuit data.

38. The encryption-decryption apparatus of claim 36, wherein the transmitter further comprises a ROM containing the circuit data.

* * * * *